United States Patent
Broyde et al.

(10) Patent No.: US 8,193,875 B2
(45) Date of Patent: Jun. 5, 2012

(54) METHOD FOR PSEUDO-DIFFERENTIAL TRANSMISSION USING A NON-UNIFORM INTERCONNECTION

(75) Inventors: Frédéric Broyde, Maule (FR); Evelyne Clavelier, Maule (FR)

(73) Assignee: EXCEM, Maule (FR)

(*) Notice: Subject to any disclaimer, the term of this patent is extended or adjusted under 35 U.S.C. 154(b) by 0 days.

(21) Appl. No.: 13/175,000

(22) Filed: Jul. 1, 2011

(65) Prior Publication Data

US 2011/0260813 A1    Oct. 27, 2011

Related U.S. Application Data

(63) Continuation of application No. PCT/IB2010/051863, filed on Apr. 28, 2010.

(51) Int. Cl.
*H01P 5/12* (2006.01)
(52) U.S. Cl. .......................................... 333/125; 333/33
(58) Field of Classification Search ............... 333/1, 12, 333/24 R, 100, 124, 125; 326/30
See application file for complete search history.

(56) References Cited

U.S. PATENT DOCUMENTS

| | | | |
|---|---|---|---|
| 5,638,322 A | 6/1997 | Lacey | |
| 5,805,030 A * | 9/1998 | Dhuey et al. | 333/1 |
| 5,818,261 A | 10/1998 | Perner | |
| 5,994,925 A | 11/1999 | Sessions | |
| 6,040,524 A * | 3/2000 | Kobayashi et al. | 174/36 |
| 6,133,805 A * | 10/2000 | Jain et al. | 333/1 |
| 6,512,423 B2 * | 1/2003 | Koga | 333/1 |
| 7,080,186 B2 | 7/2006 | Simon et al. | |
| 7,099,395 B1 | 8/2006 | Sidiropoulos et al. | |
| 2006/0267633 A1 | 11/2006 | King | |
| 2011/0187474 A1 * | 8/2011 | Broyde et al. | 333/2 |

FOREIGN PATENT DOCUMENTS

| | | |
|---|---|---|
| FR | 0300064 A1 | 7/2004 |
| FR | 0302814 A1 | 9/2004 |
| FR | 0705260 A1 | 1/2009 |
| FR | 0803985 A1 | 1/2010 |
| FR | 0804429 A1 | 2/2010 |

(Continued)

OTHER PUBLICATIONS

Broyde et al.; A New Method for the Reduction of Crosstalk and Echo in Multiconductor Interconnections; IEEE Transactions on Circuits and Systems; vol. 52, No. 2; Feb. 2005; pp. 405-416.

(Continued)

*Primary Examiner* — Dean O Takaoka
*Assistant Examiner* — Alan Wong
(74) *Attorney, Agent, or Firm* — Barnes & Thornburg LLP

(57) ABSTRACT

The invention relates to a method and a device for pseudo-differential transmission through interconnections used for sending a plurality of electrical signals.
An interconnection having 4 transmission conductors and a return conductor distinct from the reference conductor cannot be modeled as a uniform multiconductor transmission line. Each end of the interconnection is connected to a termination circuit. Three damping circuits are connected between the return conductor and the reference conductor. The transmitting circuits receive at their inputs the signals from the 4 channels of the two sources, and are connected to the interconnection. The receiving circuits are connected to the interconnection, each receiving circuit being such that the signals of the 4 channels of a source connected to a transmitting circuit in the activated state are sent to the four channels of the destinations, without noticeable echo, internal crosstalk and external crosstalk.

13 Claims, 9 Drawing Sheets

FOREIGN PATENT DOCUMENTS

| | | |
|---|---|---|
| FR | 0804430 A1 | 2/2010 |
| WO | 2004062129 A1 | 7/2004 |
| WO | 2004079941 A2 | 9/2004 |
| WO | 2009013644 A1 | 1/2009 |
| WO | 2010004448 A1 | 1/2010 |
| WO | 2010015947 A1 | 2/2010 |
| WO | 2010015948 A1 | 2/2010 |

OTHER PUBLICATIONS

Broyde et al.; Comments and Corrections on a New Method for the Reduction of Crosstalk and Echo in Multiconductor Interconnections; IEEE Transactions on Circuits and Systems; vol. 53, No. 8; Aug. 2006; p. 1851.

Broyde et al.; A new pseudo-differential transmission scheme for on-chip and on-board interconnections; Proc. of the CEM 08 Int. Symp. on Electromagnetic Compatibility; Paris; May 2008; session C7.

Broyde et al.; Designing a ZXnoise Pseudo-Differential Link; Proc. of the 18th IEEE Conf. on Electrical Performance of Electronic Packaging and Systems; EPEPS 2009; Oct. 19-21, 2009; pp. 5-8.

Broyde et al.; Echo-Free and Crosstalk-Free Transmission in Particular Interconnections; IEEE Microwave and Wireless Components Letters; vol. 19, No. 4; Apr. 2009; pp. 209-211.

Broyde et al.; Modeling the Interconnection of a Pseudo-Differential Link Using a Wide Return Conductor; Proceedings of the 13th IEEE Workshop on Signal Propagation on Interconnects; SPI 2009; May 12-15, 2009, Strasbourg, France.

Broyde et al.; Pseudo-differential links using a wide return conductor and a floating termination circuit; Proc. of the 2008 IEEE Int. Midwest Symp. on Circuits and Systems (MWSCAS); Aug. 10-13, 2008; Knoxville, USA; pp. 586-589.

Carusone et al.; Differential signaling with a reduced number of signal paths; IEEE Transactions on Circuits and Systems II; vol. 48, No. 3; pp. 294-300; Mar. 2001.

Search Report for International Patent Application No. PCT/IB2010/051863; Sep. 23, 2010.

* cited by examiner

METHOD FOR PSEUDO-DIFFERENTIAL TRANSMISSION USING A NON-UNIFORM INTERCONNECTION

CROSS REFERENCE TO RELATED APPLICATIONS

This is a Continuation Application of PCT application PCT/IB2010/051863, filed 28 Apr. 2010, published in English under No. WO 2011/036573, which in turn claims priority to French patent application No. 09/04611 filed 28 Sep. 2009 and entitled "Procédé de transmission pseudo-différentiel utilisant une interconnexion non uniforme", both of which are incorporated herein by reference.

FIELD OF THE INVENTION

The invention relates to a method and a device for pseudo-differential transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;
the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

We shall consider three transmission impairments: echo, internal crosstalk and external crosstalk. Internal crosstalk refers to crosstalk within the interconnection, between the different transmission channels. External crosstalk refers to crosstalk involving couplings between the interconnection and the external world.

There are transmission methods intended to provide a good protection against external crosstalk: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Transactions on Circuits and Systems II*, vol. 48, No. 3, pp. 294-300 in March 2001 and the section 4.2.3 of the book of F. Yuan entitled *CMOS current-mode circuits for data communications*, published by Springer in 2007).

A differential device for transmission providing m transmission channels uses an interconnection having n=2m transmission conductors. A pseudo-differential transmission device providing m transmission channels uses an interconnection having n=m transmission conductors and a common conductor distinct from the reference conductor (ground).

It should be noted that the wording "pseudo-differential" is also applied to devices which are not related in any way to pseudo-differential transmission. For instance, the patent application number US 2006/0267633 of the United States of America entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 of the United States of America entitled "Apparatus and method for improving common mode noise rejection in pseudo-differential sense amplifiers" relates to sense amplifiers which to some extent look like conventional differential amplifiers: this invention is not related to pseudo-differential transmission in any way.

A pseudo-differential transmission device providing m=4 transmission channels is shown in FIG. 1, this device comprising an interconnection (1) having n=4 transmission conductors (11) (12) (13) (14) plus a common conductor (10) distinct from the reference conductor (7).

In FIG. 1, a transmitting circuit (5) receives at its input the signals of the m channels of the source (2), and its n output terminals are connected to the n transmission conductors (11) (12) (13) (14) of the interconnection (1). Close to the transmitting circuit (5), the common conductor (10) is grounded. Close to a receiving circuit (6), a termination circuit (4) is connected to the conductors (10) (11) (12) (13) (14) of the interconnection (1). The receiving circuit (6) has its n+1 input terminals connected to the conductors (10) (11) (12) (13) (14) of the interconnection (1), one of these conductors being the common conductor (10). The receiving circuit (6) produces voltages at its output terminals connected to the destination (3), each of these voltages being determined by one and only one of the natural voltages referenced to the common conductor, a natural voltage referenced to the common conductor being defined as a voltage between one of the transmission conductors (11) (12) (13) (14) and the common conductor (10). The device shown in FIG. 1 provides m transmission channels, such that the signals of the m channels of the source (2) are sent to the m channels of the destination (3).

In some pseudo-differential transmission devices, there is no termination circuit, as is the case in the patent of the United States of America U.S. Pat. No. 5,818,261 entitled "Pseudo-differential bus driver/receiver for field programmable devices", in the patent of the United States of America U.S. Pat. No. 5,994,925 entitled "Pseudo-differential logic receiver" and in the patent of the United States of America U.S. Pat. No. 7,099,395 entitled "Reducing coupled noise in pseudo-differential signaling". In this case, substantial reflections of signals occur, and the specialists know that this implies limitations on the length L of the interconnection (L must be sufficiently small) and on the available bandwidth.

In FIG. 1, the termination circuit (4) is floating. Consequently, there is no constraint on the manner of routing the interconnection (1) with respect to ground (7), so that the distance between the conductors of the interconnection (1) and the reference conductor (7) may vary as a function of the curvilinear abscissa (i.e. the arc length measured from the origin), denoted by z, along the interconnection. This implies that it is a priori not possible to model propagation in the interconnection using a uniform multiconductor transmission line having n+2=6 conductors, a uniform multiconductor transmission line being a multiconductor transmission line having uniform electrical characteristics over its length.

In the following, for brevity, we shall use "abscissa" to designate a curvilinear abscissa.

The prior art concerning transmission with reduced external crosstalk and reduced echo, applicable to this patent application, is set out in the 3 following patents applications:

the French patent application number 07/05260 of 20 Jul. 2007 entitled "Procédé et dispositif pour les transmissions pseudo-différentielles", corresponding to the international application number PCT/IB2008/052102 of 29 May 2008 (WO 2009/013644), entitled "Method and device for pseudo-differential transmission";

the French patent application number 08/04429 of 4 Aug. 2008, entitled "Procédé de transmission pseudo-différentiel utilisant des variables électriques modales", corresponding to the international application number PCT/IB2009/052638 of 19 Jun. 2009 (WO 2010/015947), entitled "Method for pseudo-differential transmission using modal electrical variables";

the French patent application number 08/04430 of 4 Aug. 2008, entitled "Procédé de transmission pseudo-différentiel utilisant des variables electriques naturelles", corresponding to the international application number PCT/IB2009/052645 of 19 Jun. 2009 (WO 2010/015948), entitled "Method for pseudo-differential transmission using natural electrical variables".

In the case of the pseudo-differential transmission schemes disclosed in said French patent applications number 07/05260, number 08/04429 and number 08/04430, and in the corresponding international applications, the common conductor is referred to as "return conductor".

The method for pseudo-differential transmission disclosed in said French patent application number 07/05260 and the corresponding international application is for instance presented in the article of F. Broydé and E. Clavelier entitled "A new pseudo-differential transmission scheme for on-chip and on-board interconnections" published in the proceedings of the "14$^{ème}$ colloque international sur la compatibilité électromagnéetique—CEM 08", which took place in Paris, France, in May 2008, and in the article of F. Broydé and E. Clavelier entitled "Pseudo-differential links using a wide return conductor and a floating termination circuit", published in the proceedings of the "2008 IEEE International Midwest Symposium on Circuits and Systems (MWSCAS)", which took place in Knoxville, Tenn., USA, in August 2008. These articles show that this method does not provide a reduction of internal crosstalk.

The FIG. 2 shows a termination circuit which may be used for implementing the methods for pseudo-differential transmission disclosed in said French patent application number 07/05260 and the corresponding international application, in the case n=4. The termination circuit (4) shown in FIG. 2 comprises n signal terminals (41), a common terminal (40) and n resistors (405) (406) (407) (408) each connected between the common terminal (40) and one and only one of said signal terminals (41). Each of said signal terminals (41) is intended to be connected to one and only one of the transmission conductors, and the common terminal (40) is intended to be connected to the return conductor.

The methods for pseudo-differential transmission disclosed in said French patent applications number 08/04429 and number 08/04430, and the corresponding international applications, are capable of simultaneously reducing echo, internal crosstalk and external crosstalk.

The FIG. 3 shows a termination circuit which may be used for implementing the methods for pseudo-differential transmission disclosed in said French patent applications number 08/04429 and 08/04430, and the corresponding international applications, in the case n=4. The termination circuit (4) shown in FIG. 3 comprises n signal terminals (41), a common terminal (40), n resistors (405) (406) (407) (408) each connected between the common terminal (40) and one and only one of said signal terminals (41), and n (n−1)/2 resistors (4012) (4013) (4014) (4023) (4024) (4034) each connected between two of said signal terminals (41). Here also, each of said signal terminals (41) is intended to be connected to one and only one of said transmission conductors, and the common terminal (40) is intended to be connected to the return conductor.

The methods for pseudo-differential transmission disclosed in said French patent applications number 07/05260, number 08/04429 and number 08/04430, and the corresponding international applications, are very effective for the reduction of echo and external crosstalk. These methods use an interconnection having n transmission conductors and a return conductor distinct from a reference conductor (ground), said interconnection being such that it can be modeled, in a part of the frequency band used for transmission, taking into account the lumped impedances seen by the interconnection and caused by the circuits connected to the interconnection elsewhere than at the ends of the interconnection, as a (n+1)-conductor uniform multiconductor transmission line, said multiconductor transmission line using the natural voltages referenced to the return conductor and the natural currents as natural electrical variables, a natural voltage referenced to the return conductor being defined as a voltage between one of the transmission conductors and the return conductor.

It is in many cases not possible to build an interconnection, having n transmission conductors and a return conductor, which may be modeled, in an suitable part of the frequency band used for transmission, taking into account the lumped impedances seen by the interconnection and caused by the circuits connected to the interconnection elsewhere than at the ends of the interconnection, as a uniform multiconductor transmission line. This for instance often occurs when the interconnection spreads over several substrates having significantly different dielectric constants.

As an example, FIG. 4 shows the physical configuration of a pseudo-differential transmission device corresponding to the schematic diagram of FIG. 1, in which the transmitting circuit (5) is built in the chip (911) of a first integrated circuit (91) and in which the receiving circuit (6) and the termination circuit (4) are built in the chip (921) of a second integrated circuit (92). In FIG. 4, the electrical signals must propagate from the transmitting circuit (5) to the receiving circuit (6) through the chip (911) of the first integrated circuit (91), the first level of interconnect (912) of the first integrated circuit (91), the package substrate (913) of the first integrated circuit (91), the second level of interconnect (914) of the first integrated circuit (91), a printed circuit board (90), the second level of interconnect (924) of the second integrated circuit (92), the package substrate (923) of the second integrated circuit (92), the first level of interconnect (922) of the second integrated circuit (92), and the chip (921) of the second integrated circuit (92). In this example, the frequency band of the signals, the physical dimensions of the different items and their electrical characteristics are such that:

a) the designer must consider an interconnection extending from the location of the transmitting circuit (5) in the chip (911) of the first integrated circuit (91) to the location of the termination circuit (4) in the chip (921) of the second integrated circuit (92);
b) this interconnection cannot be modeled as a (n+1)-conductor uniform multiconductor transmission line using the natural voltages referenced to the return conductor and the natural currents as natural electrical variables, in a suitable part of the frequency band used for transmission;
c) this interconnection can be modeled, in an suitable part of the frequency band used for transmission, taking into account the lumped impedances seen by the interconnection and caused by the circuits connected to the interconnection elsewhere than at the ends of the interconnection, as a (n+1)-conductor non-uniform multiconductor transmission line, said multiconductor transmission line using the natural voltages referenced to the return conductor and the natural currents as natural electrical variables, a non-uniform multiconductor transmission line being a multi-conductor transmission line having non-uniform electrical characteristics over its length.

Unfortunately, whenever an interconnection cannot be modeled, in a suitable part of the frequency band used for transmission, taking into account the lumped impedances seen by the interconnection and caused by the circuits connected to the interconnection elsewhere than at the ends of the interconnection, as a (n+1)-conductor uniform multiconductor transmission line using the natural voltages referenced to the return conductor and the natural currents as natural electrical variables, the methods disclosed in said French patent applications number 07/05260, number 08/04429 and number 08/04430, and the corresponding international applications, cannot be used and it can be shown that the propagation of signals generates reflected waves from within the interconnection, such reflections producing echo and internal crosstalk.

DESCRIPTION OF THE INVENTION

The purpose of the method of the invention is the transmission through a non-uniform interconnection having two or more transmission conductors and a return conductor, the transmission being protected against echo and external crosstalk.

The invention is about a method for transmitting through an interconnection having n transmission conductors and a return conductor distinct from a reference conductor (ground), n being an integer greater than or equal to 2, said method providing, in a known frequency band, m transmission channels each corresponding to a signal to be sent from the input of at least one transmitting circuit to the output of at least one receiving circuit, where m is an integer greater than or equal to 2 and less than or equal to n, said method comprising the steps of:
modeling the interconnection in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line using natural voltages referenced to the return conductor and natural currents as natural electrical variables, said multiconductor transmission line having a per-unit-length impedance matrix and a per-unit-length admittance matrix which are not both uniform or substantially uniform over the length of said multiconductor transmission line, the characteristic impedance matrix of said multiconductor transmission line being uniform (or substantially uniform) over the length of said multiconductor transmission line;
coupling the terminals of at least one termination circuit to said return conductor and to each of said transmission conductors, said at least one termination circuit being, in said part of said known frequency band, approximately characterized, for said interconnection, by an impedance matrix with respect to the return conductor, said impedance matrix with respect to the return conductor being a matrix of size n×n.

Said part of said known frequency band can be any subset of said known frequency band. It is important to clearly distinguish the interconnection, a physical device composed of conductors and dielectrics, from the model which describes some of its properties, which is here the model of the multiconductor transmission line having non-uniform electrical characteristics over its length, also referred to as the model of the non-uniform multiconductor transmission line. This model is not capable of describing all interconnections, but it must be suitable for modeling said interconnection, in said part of said known frequency band, with a sufficient accuracy. In this application, any part of an interconnection which is not considered as a conductor is referred to as a dielectric, so that vacuum is a dielectric.

Said interconnection may be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

According to the invention, said interconnection may be structurally combined with the reference conductor throughout the length of the interconnection. Consequently, if said interconnection is made with a printed circuit board, the reference conductor may be a conductor of the printed circuit board, this conductor being not a part of said interconnection. Consequently, if said interconnection is made with a cable, the reference conductor may be a conductor of the cable (the cable therefore comprises at least n+2 conductors in this case), but the reference conductor is nevertheless not a part of said interconnection.

According to the invention, the return conductor is distinct from the reference conductor. It is therefore important to clarify the concept of distinct conductors, in the framework of the theory of multiconductor transmission lines. In the framework of this theory, a conductor may be made of several sufficiently interconnected conductors. This is for instance the case with the stripline structure well known to the person skilled in the art, in which the reference conductor is made of two ground planes connected the one to the other at many points. By the same token, it is appropriate to treat as a single reference conductor a plurality of conductors between which a low impedance is maintained in said part of said known frequency band, at a sufficient number of points along the direction of propagation. As an example, in a multilayer printed circuit board, the traces of an internal layer, used as transmission conductors, may be routed between a conducting plane used as ground (ground plane) and a conducting plane connected to a power supply voltage (power plane). The person skilled in the art knows that, if a low impedance is maintained between these conducting planes by a sufficient number of decoupling capacitors connected between these conducting planes and spread over along said traces of an internal layer, then the two conducting planes, though at different potentials, indeed behave as a single reference conductor for the propagation of signals at sufficiently high frequencies. The wording "reference conductor" may therefore designate several conductors connected to each other at a sufficient number of points along the direction of propagation, through sufficiently low impedances in said part of said known frequency band. The wording "return conductor" may also designate several conductors connected to each other at a sufficient number of points along the direction of propagation, through impedances sufficiently low in said part of said known frequency band.

For any integer j greater than or equal to 1 and less than or equal to n, at a given abscissa, denoted by z, along said interconnection, let us use $i_j$ to denote the natural current of index j, that is to say the current flowing in the transmission conductor number j, and let us use $v_{Rj}$ to denote the natural voltage referenced to the return conductor of index j, that is to say the voltage between the transmission conductor number j and said return conductor. We may define the column-vector $I_R$ of the natural currents $i_1, \ldots, i_n$ and the column-vector $V_R$ of the natural voltages referenced to the return conductor $v_{R1}, \ldots, v_{Rn}$.

According to the invention, the interconnection is modeled as a (n+1)-conductor multiconductor transmission line using said natural voltages referenced to the return conductor and said natural currents as natural electrical variables, with a sufficient accuracy in said part of said known frequency band, taking into account the lumped impedances seen by the interconnection and caused by the circuits connected to the interconnection elsewhere than at the ends of the interconnection. This is a remarkable property of the method of the invention. It is clear for the specialist that this property implies that all conductors other than the conductors of the interconnection may be neglected when one models propagation in the interconnection and that, in particular, the reference conductor may be neglected when one models propagation in the interconnection.

Said (n+1)-conductor multiconductor transmission line may nevertheless be defined in the whole known frequency band. At each abscissa z along the interconnection, at any frequency f in said known frequency band, said (n+1)-conductor multiconductor transmission line consequently has a per-unit-length impedance matrix $Z_R$ and a per-unit-length admittance matrix $Y_R$. The applicable telegrapher's equations are:

$$\begin{cases} \dfrac{dV_R}{dz} = -Z_R I_R \\ \dfrac{dI_R}{dz} = -Y_R V_R \end{cases} \quad (1)$$

The (n+1)-conductor multiconductor transmission line defined by the equation (1) uses said natural voltages referenced to the return conductor and said natural currents as variables. These variables are referred to as "natural electrical variables" in contrast to the "modal electrical variables" defined below. $Z_R$ and $Y_R$ are matrices of size n×n.

According to the invention, the per-unit-length impedance matrix $Z_R$ and the per-unit-length admittance matrix $Y_R$ cannot be considered as both uniform over the length of said multiconductor transmission line, so that said multiconductor transmission line is a non-uniform multiconductor transmission line. In other words, we must consider that $Z_R$ and $Y_R$ depend on the abscissa z. Consequently, the classical results concerning uniform multiconductor transmission lines may in general not be transposed to the multiconductor transmission line used to model the interconnection. However, the specialist understands that, at each abscissa z, it is possible to define a characteristic impedance matrix and transition matrices from modal electrical variables to natural electrical variables, using the same definitions as the ones used, for a uniform multiconductor transmission line, in the article of F. Broydé and E. Clavelier entitled "A New Method for the Reduction of Crosstalk and Echo in Multiconductor Interconnections", published in the journal *IEEE Transactions on Circuits and Systems I*, vol. 52, No. 2, pages 405 to 416, in February 2005, corrected and supplemented by the article of F. Broydé and E. Clavelier entitled "Corrections to <<A New Method for the Reduction of Crosstalk and Echo in Multiconductor Interconnections>>", published in the journal *IEEE Transactions on Circuits and Systems I*, vol. 53, No. 8, page 1851 in August 2006.

At a given abscissa z, $Z_R$ and $Y_R$ being symmetrical matrices, $Z_R Y_R$ and $Y_R Z_R$ have the same eigenvalues, and we shall use $T_R$ and $S_R$ to denote two invertible matrices such that:

$$\begin{cases} T_R^{-1} Y_R Z_R T_R = D_R \\ S_R^{-1} Z_R Y_R S_R = D_R \end{cases} \quad (2)$$

$$\text{where } D_R = \text{diag}_n(\gamma_1^2, \ldots, \gamma_n^2) \quad (3)$$

is the diagonal matrix of order n of the eigenvalues of $Y_R Z_R$. The multiconductor transmission line being non-uniform, we cannot say that each $\gamma_j$ is a propagation constant of the (n+1)-conductor multiconductor transmission line. We note that, $Z_R$ and $Y_R$ depending on the abscissa z, it is in general not possible to consider that $T_R$ and $S_R$ satisfying the equations (2) and (3) define a "modal transform".

As from the equations (1), (2) and (3), it is possible to define, at a given abscissa z, a characteristic impedance matrix of said (n+1)-conductor multiconductor transmission line, referred to as "characteristic impedance matrix with respect to the return conductor", or as "characteristic impedance matrix" when no confusion can arise, and denoted by $Z_{RC}$, as:

$$\begin{aligned} Z_{RC} &= S_R \Gamma_R^{-1} S_R^{-1} Z_R \\ &= S_R \Gamma_R S_R^{-1} Y_R^{-1} \\ &= Y_R^{-1} T_R \Gamma_R T_R^{-1} \\ &= Z_R T_R \Gamma_R^{-1} T_R^{-1} \end{aligned} \quad (4)$$

where $$\Gamma_R = \text{diag}_n(\gamma_1, \ldots, \gamma_n) \quad (5)$$

is a diagonal matrix of size n×n. In general, the characteristic impedance matrix of a non-uniform multiconductor transmission line is a frequency-dependent complex matrix, which also depends on the abscissa z. However, according to the invention, the (n+1)-conductor non-uniform multiconductor transmission line used to model the interconnection is such that the characteristic impedance matrix of said multiconductor transmission line is substantially uniform over its length. Consequently, according to the invention, the characteristic impedance matrix is a frequency-dependent complex matrix of size n × n, which substantially does not depend on the abscissa z. It can be shown that this characteristic is such that the propagation of signals substantially does not generate reflected waves from within the interconnection.

According to the invention, said at least one termination circuit is, in said part of said known frequency band, approximately characterized, for said interconnection, by an impedance matrix with respect to the return conductor. Let us use $Z_{RL}$ to denote this impedance matrix with respect to the return conductor. According to the invention, $Z_{RL}$ is a matrix of size n×n. This indicates that, in said part of said known frequency band, said at least one termination circuit approximately behaves as if it was not connected to ground, hence as a floating (n+1)-terminal circuit element. The specialist understands that, consequently, in an ideal implementation, said at least one termination circuit may be such that it does not have an impedance matrix with respect to the reference conductor.

The method of the invention is particularly advantageous in three circumstances.

In the first circumstance, the method of the invention is such that, in said part of said known frequency band, said impedance matrix with respect to the return conductor (i.e., $Z_{RL}$) is equal to (or substantially equal to) a diagonal matrix, the method of the invention further comprising the steps of:

using one said transmitting circuit receiving m "input signals of the transmitting circuit" corresponding each to a transmission channel, the output of said transmitting circuit being coupled to at least m of said transmission conductors, the output of said transmitting circuit delivering natural electrical variables, each of said natural electrical variables being mainly determined by one and only one of said "input signals of the transmitting circuit"; and using one said receiving circuit delivering m "output signals of the receiving circuit" corresponding each to a transmission channel, the input of said receiving circuit being coupled to at least m of said transmission conductors and to said return conductor, each of said "output signals of the receiving circuit" being mainly determined by one and only one of the natural voltages referenced to the return conductor.

In the first circumstance, the transmission is protected against external crosstalk and it can be shown that echo may be effectively reduced if the termination circuit is designed so as to obtain a sufficiently small value of a suitable norm of the matrix of the voltage reflection coefficients, with respect to the return conductor, of said termination circuit, denoted by $P_R$ and given by $$P_R = (Z_{RL} - Z_{RC})(Z_{RL} + Z_{RC})^{-1} \quad (6)$$

For instance, at least one termination circuit may be proportioned such that, in said part of said known frequency band, each component of the matrix $P_R$ has an absolute value less than or equal to a sufficiently small arbitrary value, for instance 15/100. However, since $Z_{RL}$ is substantially a diagonal matrix in the first circumstance, there is a non-zero minimum value of $P_R$.

In the second circumstance, the method of the invention is such that, in said part of said known frequency band, said impedance matrix with respect to the return conductor (i.e., $Z_{RL}$) is a non-diagonal matrix equal to (or substantially equal to) said characteristic impedance matrix (i.e., $Z_{RC}$), the method of the invention being such that, at each point along said multiconductor transmission line, in said part of said known frequency band, there exists an invertible matrix, denoted by S, such that the inverse of S times said per-unit-length impedance matrix times said per-unit-length admittance matrix times S is a diagonal matrix (or substantially a diagonal matrix), said matrix S being uniform (or substantially uniform) over the length of said multiconductor transmission line. In other words, the second part of the last sentence means that, in this second circumstance, the method of the invention is such that, at each abscissa z along said multiconductor transmission line, in said part of said known frequency band, there exists a non-singular matrix S such that $S^{-1} Z_R Y_R S$ is a diagonal matrix (or substantially a diagonal matrix), said matrix S being independent (or substantially independent) of the abscissa z along said (n+1)-conductor multiconductor transmission line. Clearly, the matrix $S_R = S$ satisfies the second line of equation (2) and is independent of z. Let us use $^tA$ to denote the transpose of a matrix A. The matrices $Z_R$ and $Y_R$ being symmetrical, we observe that the matrix $T_R$ given by $$T_R = {}^t S_R^{-1} \quad (7)$$

is a solution of the first line of the equation (2) and is independent of z. Using this choice of a matrix $S_R$ and of a matrix $T_R$, we may define the column-vector $V_{RM}$ and the column-vector $I_{RM}$, given by:

$$\begin{cases} V_R = S_R V_{RM} \\ I_R = T_R I_{RM} \end{cases} \quad (8)$$

We note that, in the second circumstance, the method of the invention is such that, at each point along said multiconductor transmission line, in said part of said known frequency band, there exists an invertible matrix, denoted by T, such that the inverse of T times said per-unit-length admittance matrix times said per-unit-length impedance matrix times T is a diagonal matrix (or substantially a diagonal matrix), said matrix T being uniform (or substantially uniform) over the length of said multiconductor transmission line.

The matrices $Z_{RC}$, $S_R$ and $T_R$ being independent of z, it can then be shown that the second-order differential equations satisfied by the new variables $V_{RM}$ and $I_{RM}$ are $$\begin{cases} \dfrac{d^2 V_{RM}}{dz^2} - \Gamma_R^2 V_{RM} = \dfrac{d\Gamma_R}{dz} \Gamma_R^{-1} \dfrac{dV_{RM}}{dz} \\ \dfrac{d^2 I_{RM}}{dz^2} - \Gamma_R^2 I_{RM} = \dfrac{d\Gamma_R}{dz} \Gamma_R^{-1} \dfrac{dI_{RM}}{dz} \end{cases} \quad (9)$$

Clearly, $\Gamma_R$ and $d\Gamma_R/dz$ being diagonal matrices, these differential equations are decoupled, so that we have achieved a modal decomposition. Consequently, in the second circumstance, we can consider that $I_{RM}$ is the column-vector of the n modal currents $i_{RM1}, \ldots, i_{RMn}$, that $V_{RM}$ is the column-vector of the n modal voltages $v_{RM1}, \ldots, v_{RMn}$, and that the $\gamma_i$ are the propagation constants of the different propagation modes of said (n+1)-conductor multiconductor transmission line.

Consequently, if $S_R = S$ and if $T_R$ is given by equation (7), we will refer to $S_R$ as the "transition matrix from modal voltages to natural voltages" and we will refer to $T_R$ as the "transition matrix from modal currents to natural currents" (for comparison with said French patent application number 09/04611, it is useful to note that the transition matrix from the basis C to the basis B is called "matrice de passage de la base B à la base C" in French). The wording "modal electrical variable" will indiscriminately designate a modal current or a modal voltage. The matrices $S_R$ and $T_R$ are therefore the transition matrices from modal electrical variables to natural electrical variables.

In the second circumstance, it can be shown that echo and internal crosstalk are very effectively reduced if the method of the invention further comprises the steps of:

using one said transmitting circuit receiving m "input signals of the transmitting circuit" corresponding each to a transmission channel, the output of said transmitting circuit being coupled to the n transmission conductors, the output of said transmitting circuit delivering modal electrical variables defined by a transition matrix from modal electrical variables to natural electrical variables, said transition matrix from modal electrical variables to natural electrical variables being equal to said matrix S or to the inverse of the transpose of said matrix S, each of said modal electrical variables being mainly determined by one and only one of said "input signals of the transmitting circuit"; and using one said receiving circuit delivering m "output signals of the receiving circuit" corresponding each to a transmission channel, the input of said receiving circuit being coupled to the n transmission conductors and to said return conductor, said receiving circuit combining the natural voltages referenced to the return conductor according to linear combinations, each of said "output signals of the receiving circuit" being mainly determined by one and only one of said modal electrical variables defined by said transition matrix from modal electrical variables to natural electrical variables.

In the second circumstance, the output of one of said transmitting circuits delivers modal electrical variables, said modal electrical variables being defined by said transition matrix from modal electrical variables to natural electrical variables of said (n+1)-conductor multiconductor transmission line, each of said modal electrical variables being mainly determined by one and only one of said "input signals of the transmitting circuit". This must be interpreted in a broad sense, as: each of said modal electrical variables is mainly determined, at each point in time, by the history, up to said point in time, of one and only one of said "input signals of the transmitting circuit". The use of either modal currents or modal voltages as modal electrical variables being without physical effect, let us for instance use modal voltages as modal electrical variables. In this case, $V_{RM}$ produced by said one of said transmitting circuits is determined, at each point in time, by the history, up to said point in time, of said "input signals of the transmitting circuit". Therefore, using equation (8), we see that, at each frequency f in said known frequency band, said one of said transmitting circuits must produce, at its point of connection to the interconnection, on each transmission conductor, the natural voltages referenced to the return conductor of the column-vector $V_R(f)$ given by:

$$V_R(f) = S_R(f) V_{RM}(f) \tag{10}$$

where we write the frequency dependence to designate frequency domain quantities, and where the Fourier transform $$V_{RM}(f) = \int_{-\infty}^{+\infty} V_{RM}(t) e^{-2i\pi ft} dt \tag{11}$$

gives the frequency domain vector $V_{RM}(f)$ as a function of the time domain vector $V_{RM}(t)$ at a given point in time t. We also see that, at each point in time t, said one of said transmitting circuits must produce, on each conductor, at its point of connection to the interconnection, the natural voltages referenced to the return conductor of the column-vector $V_R(t)$ given by the inverse Fourier transform $$V_R(t) = 2 \text{Re} \left[ \int_0^{+\infty} V_R(f) e^{2i\pi ft} df \right] \tag{12}$$

where the integration over all positive frequencies may of course be replaced by an integration over said known frequency band. Consequently, causality implies that each of said natural voltages referenced to the return conductor is mainly determined, at each point in time, by the history, up to said point in time, of "input signals of the transmitting circuit".

In the second circumstance, one of said receiving circuits delivers "output signals of the receiving circuit", each of said "output signals of the receiving circuit" being mainly determined by one and only one of said modal electrical variables, said modal electrical variables being defined by said transition matrix from modal electrical variables to natural electrical variables of said (n+1)-conductor multiconductor transmission line. This must be interpreted in a broad sense, as: each of said "output signals of the receiving circuit" is mainly determined, at each point in time, by the history, up to said point in time, of one and only one of said modal electrical variables. Since the use of either modal currents or modal voltages as modal electrical variables is without physical effect, and since said one of said receiving circuits combines the natural voltages referenced to the return conductor present on the interconnection, let us for instance use modal voltages as modal electrical variables. In this case, said "output signals of the receiving circuit" are mainly determined, at each point in time, by the history, up to said point in time, of $V_{RM}$ at the input of said one of said receiving circuits. We also see that said one of said receiving circuits must, at each point in time t, use the column-vector $V_{RM}(t)$ given by the inverse Fourier transform $$V_{RM}(t) = 2 \text{Re} \left[ \int_0^{+\infty} V_{RM}(f) e^{2i\pi ft} df \right] \tag{13}$$

where we write the frequency dependence to designate frequency domain vectors, and where, according to equation (8), $V_{RM}(f)$ is given by $$V_{RM}(f) = S_R^{-1}(f) V_R(f) \tag{14}$$

In equation (13), the integration over all positive frequencies may of course be replaced by an integration over said known frequency band. Since said one of said receiving circuits must sense on the interconnection, at its point of connection to the interconnection, the natural voltages referenced to the return conductor, we see that the column-vector $V_R(f)$ used in equation (14) is given by the Fourier transform $$V_R(f) = \int_{-\infty}^{+\infty} V_R(t) e^{-2i\pi ft} dt \tag{15}$$

Consequently, causality implies that each of said "output signals of the receiving circuit" is mainly determined, at each point in time, by the history, up to said point in time, of $V_R$ at the input of said one of said receiving circuits.

In the third circumstance, the method of the invention is such that, in said part of said known frequency band, said impedance matrix with respect to the return conductor (i.e., $Z_{RL}$) is a non-diagonal matrix equal to (or substantially equal to) said characteristic impedance matrix (i.e., $Z_{RC}$), the method of the invention being such that, at each point along said multiconductor transmission line, in said part of said known frequency band, the product of said per-unit-length impedance matrix and said per-unit-length admittance matrix is equal (or substantially equal) to the product of a scalar and the identity matrix of order n. In the third circumstance, at each abscissa z along said multiconductor transmission line, in said part of said known frequency band, we may write $$Y_R Z_R = Z_R Y_R = \gamma^2 I_n \quad (16)$$

where $I_n$ is the identity matrix of order n and where $\gamma$ is said scalar, said scalar being a complex number which may be frequency-dependent and which may depend on z. As a consequence, the matrices $T_R$ and $S_R$ defined by the equation (2) may be chosen equal to the identity matrix of order n. Consequently, any natural electrical variable may also, in this third circumstance, be regarded as a modal electrical variable.

As from the equations (1) to (5) and (16), it is possible to show that the characteristic impedance matrix is given by:

$$Z_{RC} = \frac{1}{\gamma} Z_R = \gamma Y_R^{-1} \quad (17)$$

In the third circumstance, it can be shown that echo and internal crosstalk are very effectively reduced if the method of the invention further comprises the steps of:

using one said transmitting circuit receiving m "input signals of the transmitting circuit" corresponding each to a transmission channel, the output of said transmitting circuit being coupled to at least m of said transmission conductors, the output of said transmitting circuit delivering natural electrical variables, each of said natural electrical variables being mainly determined by one and only one of said "input signals of the transmitting circuit"; and using one said receiving circuit delivering m "output signals of the receiving circuit" corresponding each to a transmission channel, the input of said receiving circuit being coupled to at least m of said transmission conductors and to said return conductor, each of said "output signals of the receiving circuit" being mainly determined by said natural voltages referenced to the return conductor.

In the third circumstance, the output of one of said transmitting circuits delivers natural electrical variables, each of said natural electrical variables being mainly determined by one and only one of said "input signals of the transmitting circuit". This must be interpreted in a broad sense, as: each of said natural electrical variables is mainly determined, at each point in time, by the history, up to said point in time, of one and only one of said "input signals of the transmitting circuit".

In the third circumstance, one of said receiving circuits delivers "output signals of the receiving circuit", each of said "output signals of the receiving circuit" being mainly determined by said natural voltages referenced to the return conductor. This must be interpreted in a broad sense, as: each of said "output signals of the receiving circuit" is mainly determined, at each point in time, by the history, up to said point in time, of said natural voltages referenced to the return conductor.

Of course, the interconnection used in the method of the invention may possibly also be modeled as a (n+2)-conductor multiconductor transmission line, said multiconductor transmission line using natural voltages referenced to ground and natural currents as variables. For such a model, the specialist understands that the interconnection and the reference conductor are taken into account, so that it is necessary to consider, at a given abscissa z along the interconnection:

a) for any integer j greater than or equal to 1 and less than or equal to n, the natural current of index j, denoted by $i_j$;

b) the current flowing in the return conductor, denoted by $i_{n+1}$;

c) for any integer j greater than or equal to 1 and less than or equal to n, the voltage between the transmission conductor number j and said reference conductor, denoted by $v_{Gj}$;

d) the voltage between said return conductor and said reference conductor, denoted by $V_{Gn+1}$.

We may then define the column-vector $I_G$ of the currents $i_1, \ldots, i_{n+1}$ and the column-vector $V_G$ of the natural voltages referenced to ground $v_{G1}, \ldots, v_{Gn+1}$. When it is possible to define, at each abscissa z along the interconnection, at any frequency f in said part of said known frequency band, a per-unit-length impedance matrix $Z_G$ and a per-unit-length admittance matrix $Y_G$, the applicable telegrapher's equations are:

$$\begin{cases} \dfrac{dV_G}{dz} = -Z_G I_G \\ \dfrac{dI_G}{dz} = -Y_G V_G \end{cases} \quad (18)$$

In equation (18), the matrices $Z_G$ and $Y_G$ are of size (n+1)×(n+1). We have said above that, according to the invention, the interconnection may be modeled with a sufficient accuracy as a (n+1)-conductor multiconductor transmission line. Consequently, the specialist understands that, in equation (18), we may say that, to a sufficient accuracy:

the $v_{Gj} - v_{Gn+1}$ depend only on the $i_1, \ldots, i_n$;

the relationships between the $v_{Gj} - v_{Gn+1}$ and the $i_1, \ldots, i_n$ are determined by the matrices $Z_R$ and $Y_R$.

As shown in said article entitled "A new pseudo-differential transmission scheme for on-chip and on-board interconnections", it is then possible to prove that there exists a per-unit-length impedance $Z_{RG}$ and a per-unit-length admittance $Y_{RG}$ such that the matrices $Z_G$ and $Y_G$ are, in said part of said known frequency band, approximately given by $$Z_G \approx \begin{pmatrix} Z_{R11} + Z_{RG} & \cdots & Z_{R1n} + Z_{RG} & Z_{RG} \\ \vdots & \ddots & \vdots & \vdots \\ Z_{Rn1} + Z_{RG} & \cdots & Z_{Rnn} + Z_{RG} & Z_{RG} \\ Z_{RG} & \cdots & Z_{RG} & Z_{RG} \end{pmatrix} \quad (19)$$

and $$Y_G \approx \begin{pmatrix} Y_{R11} & \cdots & Y_{R1n} & -\sum_{i=1}^{n} Y_{R1i} \\ \vdots & \ddots & \vdots & \vdots \\ Y_{Rn1} & \cdots & Y_{Rnn} & -\sum_{i=1}^{n} Y_{Rni} \\ -\sum_{i=1}^{n} Y_{Ri1} & \cdots & -\sum_{i=1}^{n} Y_{Rin} & Y_{RG} + \sum_{i=1}^{n}\sum_{j=1}^{n} Y_{Rij} \end{pmatrix} \quad (20)$$

Exact equations for the matrices $Z_G$ and $Y_G$ are disclosed in the article of F. Broydé and E. Clavelier entitled "Modeling the interconnection of a pseudo-differential link using a wide return conductor", published in the proceedings of the "13th IEEE Workshop on Signal Propagation on Interconnects, SPI 2009", which was held in Strasbourg, France, in May 2009. The relationship between the equations (1) and (18) is further explained in the article of F. Broydé and B. Démoulin entitled "Designing a ZXnoise Pseudo-Differential Link", published in the proceedings of the "IEEE 18th Topical Meeting on Electrical Performance of Electronic Packaging and Systems, EPEPS 2009", which took place in October 2009.

The matrices $Z_G$ and $Y_G$ may also be used to define a characteristic impedance matrix of the (n+2)-conductor multiconductor transmission line, denoted by $Z_{GC}$ and referred to as "characteristic impedance matrix with respect to ground". $Z_{GC}$ is a matrix of size (n+1)×(n+1) and is of course different from Z. For instance, said article entitled "A new pseudo-differential transmission scheme for on-chip and on-board interconnections" shows that, if the equations (19) and (20) are exact, we have:

$$Z_{GC} = \begin{pmatrix} Z_{RC} + \sqrt{\frac{Z_{RG}}{Y_{RG}}} \begin{pmatrix} 1 \\ \vdots \\ 1 \end{pmatrix} (1 \quad \ldots \quad 1) & \sqrt{\frac{Z_{RG}}{Y_{RG}}} \begin{pmatrix} 1 \\ \vdots \\ 1 \end{pmatrix} \\ \sqrt{\frac{Z_{RG}}{Y_{RG}}} (1 \quad \ldots \quad 1) & \sqrt{\frac{Z_{RG}}{Y_{RG}}} \end{pmatrix} \quad (21)$$

The specialists know, for instance from a computation based on the geometry of the conductors and dielectrics, on the conductivity of the conductors and on the permittivity and the losses of the dielectrics, how to determine the matrices $Z_G$ and $Y_G$ of a multiconductor transmission line used for modeling the interconnection and the reference conductor, as a function of frequency and of z. The specialists also know how to measure these matrices. It is therefore clear that it is possible to proportion the conductors of a suitable structure such that:
   the equations (19) and (20) are satisfied to a sufficient accuracy in said part of said known frequency band;
   the matrix $Z_{RC}$ is substantially independent of z;
   one obtains a matrix $Z_{RC}$ approximating, in said part of said known frequency band, a wanted matrix.

Consequently, the method of the invention may be such that, prior to modeling said interconnection, one proportions said interconnection in such a way that it may, with a sufficient accuracy in said part of said known frequency band, taking into account the lumped impedances seen by the interconnection and caused by the circuits connected to the interconnection elsewhere than at the ends of the interconnection, be modeled as a (n+1)-conductor multiconductor transmission line, said multiconductor transmission line using said natural voltages referenced to the return conductor and said natural currents as natural electrical variables, the characteristic impedance matrix of said multiconductor transmission line being uniform (or substantially uniform) over its length.

Note that, in many cases, we can consider that, when computing the matrices $Z_{RC}$, $S_R$ and $T_R$ of said (n+1)-conductor multiconductor transmission line, the losses are negligible in some frequency bands, for instance when said part of said known frequency band is above 1 MHz. In this case, in said part of said known frequency band, $Z_{RC}$ is real and frequency-independent, and the matrices $S_R$ and $T_R$ may be chosen real and frequency-independent. At lower frequencies, for instance when said part of said known frequency band contains frequencies below 1 MHz, losses are often not negligible and $Z_{RC}$ cannot be considered as real, which obviously leads to a more complex implementation of the method of the invention. However, this question can often be disregarded, because internal crosstalk and echo at low frequencies may in many cases be ignored, and because, in these cases, it may be of no importance that the termination circuits present an impedance matrix near $Z_{RC}$ at these low frequencies. Consequently, said part of said known frequency band will often be contained in the interval of the frequencies ranging from 1 MHz to 100 GHz. However, the frequency above which losses may possibly be neglected for the computation of the matrices $Z_{RC}$, $S_R$ and $T_R$ of said (n+1)-conductor multiconductor transmission line depends on the shape and position of the conductors in a section of the interconnection in a plane orthogonal to the direction of propagation, and on the conductivity of the conductors. We note that in the case of on-chip interconnects, this frequency may be much higher than 1 MHz, for instance above 1 GHz.

Since, according to the invention, the properties of said (n+1)-conductor multiconductor transmission line may be defined arbitrarily outside said part of said known frequency band, it is possible to obtain that $Z_{RC}$, $S_R$ and $T_R$ are real and frequency-independent over said known frequency band, when $Z_{RC}$, $S_R$ and $T_R$ are real and frequency-independent over said part of said known frequency band. When $Z_{RC}$ is real and frequency-independent over said known frequency band, we obtain the following consequence which simplifies the design of a device for implementing the method of the invention in the second and third circumstances: the matrix $Z_{RC}$ may be realized with a network of n(n+1)/2 resistors or less. When $S_R$ and $T_R$ are real and frequency-independent over said known frequency band, we obtain the following consequences which simplify the design of a device for implementing the method of the invention in the second circumstance:
a) the equations (10), (11) and (12) defining the operation of a transmitting circuit become $$V_R(t) = S_R V_{RM}(t) \quad (22)$$

b) the equations (13), (14) and (15) defining the operation of a receiving circuit become $$V_{RM}(t) = S_R^{-1} V_R(t) \quad (23)$$

The specialist understands that a termination circuit having, at a given frequency, an impedance matrix equal to $Z_{RC}$ may be composed of n (n+1)/2 passive linear two-terminal circuits elements, n of said passive linear two-terminal circuit elements being each connected between the return conductor and one and only one of said transmission conductors, n (n−1)/2 of said passive linear two-terminal circuit elements being each connected between two of said transmission conductors. However, the specialist also understands that a termination circuit providing, at a given frequency, an impedance matrix close enough to $Z_{RC}$ may often be composed of less than n (n+1)/2 passive linear two-terminal circuit elements. The suitability of a given termination circuit may for instance be determined using a suitable norm of the matrix $Z_{RL} - Z_{RC}$. For instance, in the second and third circumstances, a termination circuit may be proportioned such that all components of the matrix $Z_{RL} - Z_{RC}$ have an absolute value less than a sufficiently small arbitrary value, for instance 3 Ohms. However, it is often more appropriate to determine the suitability of a given termination circuit using a suitable norm of the matrix of the voltage reflection coefficients, with respect to the return conductor, of said termination circuit, denoted by $P_R$ and defined by equation (6). For instance, in the second and third circumstances, at least one termination circuit may be proportioned such that, in said part of said known frequency band, each component of the matrix $P_R$ has an absolute value less than or equal to a sufficiently small arbitrary value, for instance 5/100.

In order that the invention provides the desired characteristics, it is important that the interconnection behaves, in said part of said known frequency band, taking into account the lumped impedances seen by the interconnection and caused by the circuits connected to the interconnection elsewhere than at the ends of the interconnection, as a (n+1)-conductor multiconductor transmission line, the characteristic impedance matrix of said multiconductor transmission line being substantially uniform over its length, said multiconductor transmission line using the natural voltages referenced to the return conductor and the natural currents as natural electrical variables. In some cases, in order to take into account the lumped impedances seen by the interconnection and caused by the circuits connected to it elsewhere than at its ends, the designer need only observe that they are not present or that they may be ignored. In other cases, in order to take into account the lumped impedances seen by the interconnection and caused by the circuits connected to it elsewhere than at its ends, the designer must quantitatively consider these lumped impedances to obtain that said characteristic impedance matrix is sufficiently uniform over the length of said multiconductor transmission line.

The function of the termination circuits is to ensure that no reflection of an incident signal occurs at a disturbing level, at an end of the interconnection, for the signals propagating in said (n+1)-conductor multiconductor transmission line, in said part of said known frequency band. It is clear that the lower the desired maximum crosstalk coupling level, the lower the level of reflection of incident signals which has to be regarded as disturbing, and that, in order not to exceed this level, it must be specified that the termination circuit must have a matrix $Z_{RL}$ closer to $Z_{RC}$.

According to the invention, in order to ensure that no reflection of an incident signal occurs at a disturbing level at an end of the interconnection for the signals propagating in said (n+1)-conductor multiconductor transmission line, the specialist understands that it is sufficient, when one or more transmitting circuits are connected at a single end of the interconnection, to arrange a termination circuit at the other end of the interconnection. The specialist also sees that in all other cases, that is to say when a transmitting circuit is connected elsewhere than at one end of the interconnection, and/or when transmitting circuits are connected at both ends of the interconnection, it is necessary to arrange termination circuits at both ends of the interconnection. Thus, according to the method of the invention, we may either arrange a termination circuit at one end only of the interconnection, or arrange a termination circuit at each end of the interconnection.

According to the invention, the number m of transmission channels between any one of the transmitting circuits and any one of the receiving circuits may be equal to the number n of transmission conductors. This method is preferred because it is generally the most economical. However, it is also conceivable to use a number n of transmission conductors that is greater than the number m of transmission channels.

We now describe a device for proportioning a device for implementing the method of the invention. A device for proportioning a device for transmitting through an interconnection having n transmission conductors and a return conductor distinct from a reference conductor, n being an integer greater than or equal to 2, said device for transmitting through an interconnection providing, in a known frequency band, m transmission channels, where m is an integer greater than or equal to 2 and less than or equal to n, may comprise means for modeling the interconnection, to a sufficient accuracy in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line using natural voltages referenced to the return conductor and natural currents as natural electrical variables, said multiconductor transmission line having a per-unit-length impedance matrix and a per-unit-length admittance matrix which are not both uniform (or substantially uniform) over the length of said multiconductor transmission line, the characteristic impedance matrix of said multiconductor transmission line being uniform (or substantially uniform) over the length of said multiconductor transmission line.

Said device for proportioning a device for transmitting through an interconnection having n transmission conductors and a return conductor distinct from the reference conductor may comprise means for proportioning a termination circuit, said termination circuit being, in said part of said known frequency band, approximately characterized, for said interconnection, by an impedance matrix with respect to the return conductor, said impedance matrix with respect to the return conductor being a matrix of size n×n substantially equal to said characteristic impedance matrix with respect to the return conductor.

Said device for proportioning a device for transmitting through an interconnection having n transmission conductors and a return conductor distinct from the reference conductor may comprise a computer running a suitable program.

Said device for proportioning a device for transmitting through an interconnection having n transmission conductors and a return conductor distinct from the reference conductor may be such that the means for modeling the interconnection comprise means for measuring and/or for computing the real electrical characteristics of the interconnection, based on the relative layout of the transmission conductors and of the return conductor and on the characteristics of the dielectrics surrounding them.

We now describe a device for implementing the method of the invention. A device for transmission providing, in a known frequency band, m transmission channels each corresponding to a signal to be sent from the input of at least one transmitting circuit to the output of at least one receiving circuit, where m is an integer greater than or equal to 2, comprises:

an interconnection having n transmission conductors and a return conductor distinct from a reference conductor (ground), n being an integer greater than or equal to m, the interconnection being modeled (to a sufficient accuracy), in a part of said known frequency band, taking into account the lumped impedances seen by the interconnection and caused by the circuits connected to the interconnection elsewhere than at the ends of the interconnection, as a (n+1)-conductor multiconductor transmission line, said multiconductor transmission line using the natural voltages referenced to the return conductor and the natural currents as natural electrical variables, said multiconductor transmission line having a per-unit-length impedance matrix and a per-unit-length admittance matrix which are not both uniform or substantially uniform over the length of said multiconductor transmission line, the characteristic impedance matrix of said multiconductor transmission line being uniform (or substantially uniform) over the length of said multiconductor transmission line;

at least one termination circuit coupled to said return conductor and to each of said transmission conductors, said at least one termination circuit being, when said at least one termination circuit is in the activated state, approximately characterized, for said interconnection, at least one quiescent operating point, for small signals in said part of said known frequency band, by an impedance matrix with respect to the return conductor, denoted by $Z_{RL}$, said impedance matrix with respect to the return conductor being a matrix of size n×n.

In the following, the wordings "is in the deactivated state" and "is not in the activated state" are equivalent. According to the invention, it is possible that there is a deactivated state for one or more of said termination circuits, in which the behavior of this termination circuit is different from the one defined above. However, the existence of a deactivated state for one or more of said termination circuits is not at all a characteristic of the invention.

In the first circumstance, a device for implementing the method of the invention may be such that, in said part of said known frequency band, said impedance matrix with respect to the return conductor (i.e., $Z_{RL}$) is equal to (or substantially equal to) a diagonal matrix, said device for implementing the method of the invention further comprising:

at least one said transmitting circuit receiving m "input signals of the transmitting circuit" corresponding each to a transmission channel, the output of said at least one said transmitting circuit being coupled to at least m of said transmission conductors, the output of said at least one said transmitting circuit delivering natural electrical variables when said at least one said transmitting circuit is in the activated state, each of said natural electrical variables being mainly determined by one and only one of said "input signals of the transmitting circuit"; and at least one said receiving circuit delivering, when said at least one said receiving circuit is in the activated state, m "output signals of the receiving circuit" corresponding each to a transmission channel, the input of said at least one said receiving circuit being coupled to at least m of said transmission conductors and to said return conductor, each of said "output signals of the receiving circuit" being mainly determined by one and only one of the natural voltages referenced to the return conductor.

In the second circumstance, a device for implementing the method of the invention may be such that, in said part of said known frequency band, said impedance matrix with respect to the return conductor (i.e., $Z_{RL}$) is a non-diagonal matrix equal to (or substantially equal to) said characteristic impedance matrix (i.e., $Z_{RC}$), said device for implementing the method of the invention being such that, at each point along said multiconductor transmission line, in said part of said known frequency band, there exists an invertible matrix, denoted by S, such that the inverse of S times said per-unit-length impedance matrix times said per-unit-length admittance matrix times S is a diagonal matrix (or substantially a diagonal matrix), said matrix S being uniform (or substantially uniform) over the length of said multiconductor transmission line, said device for implementing the method of the invention further comprising:

at least one said transmitting circuit receiving m "input signals of the transmitting circuit" corresponding each to a transmission channel, the output of said at least one said transmitting circuit being coupled to the n transmission conductors, the output of said at least one said transmitting circuit delivering modal electrical variables when said at least one said transmitting circuit is in the activated state, said modal electrical variables being defined by a transition matrix from modal electrical variables to natural electrical variables, said transition matrix from modal electrical variables to natural electrical variables being equal to said matrix S or to the inverse of the transpose of said matrix S, each of said modal electrical variables being mainly determined by one and only one of said "input signals of the transmitting circuit"; and at least one said receiving circuit delivering, when said at least one said receiving circuit is in the activated state, m "output signals of the receiving circuit" corresponding each to a transmission channel, the input of said at least one said receiving circuit being coupled to the n transmission conductors and to said return conductor, said at least one said receiving circuit combining the natural voltages referenced to the return conductor according to linear combinations, each of said "output signals of the receiving circuit" being mainly determined by one and only one of said modal electrical variables defined by said transition matrix from modal electrical variables to natural electrical variables.

In the third circumstance, a device for implementing the method of the invention may be such that, in said part of said known frequency band, said impedance matrix with respect to the return conductor (i.e., $Z_{RL}$) is a non-diagonal matrix equal to (or substantially equal to) said characteristic impedance matrix (i.e., $Z_{RC}$), said device for implementing the method of the invention being such that, at each point along said multiconductor transmission line, in said part of said known frequency band, the product of said per-unit-length impedance matrix and said per-unit-length admittance matrix is equal (or substantially equal) to the product of a scalar and the identity matrix of order n, said device for implementing the method of the invention further comprising:

at least one said transmitting circuit receiving m "input signals of the transmitting circuit" corresponding each to a transmission channel, the output of said at least one said transmitting circuit being coupled to at least m of said transmission conductors, the output of said at least one said transmitting circuit delivering natural electrical variables when said at least one said transmitting circuit is in the activated state, each of said natural electrical variables being mainly determined by one and only one of said "input signals of the transmitting circuit"; and at least one said receiving circuit delivering, when said at least one said receiving circuit is in the activated state, m "output signals of the receiving circuit" corresponding each to a transmission channel, the input of said at least one said receiving circuit being coupled to at least m of said transmission conductors and to said return conductor, each of said "output signals of the receiving circuit" being mainly determined by said natural voltages referenced to the return conductor.

According to the invention, it is possible that there is a deactivated state for one or more of said transmitting circuits, in which the behavior of this transmitting circuit is different from the ones defined above. However, the existence of a deactivated state for one or more of said transmitting circuits is not at all a characteristic of the invention. According to the invention, it is possible that there is a deactivated state for one or more of said receiving circuits, in which the behavior of this receiving circuit is different from the ones defined above. However, the existence of a deactivated state for one or more of said receiving circuits is not at all a characteristic of the invention.

According to the invention, the "input signals of the transmitting circuit" may be analog signals or digital signals. A transmitting circuit used in a device for implementing the method of the invention may use analog signal processing and/or digital signal processing to deliver said natural or modal electrical variables. According to the invention, the "output signals of the receiving circuit" may be analog signals or digital signals. A receiving circuit used in a device for implementing the method of the invention may use analog signal processing and/or digital signal processing to deliver said "output signals of the receiving circuit".

For a termination circuit used in the second circumstance or in the third circumstance, the requirement relating to $Z_{RL}$, namely that $Z_{RL}$ must be a non-diagonal matrix of size n×n approximately equal to $Z_{RC}$, should be applicable to the normal operation of the device for implementing the method of the invention. Said quiescent operating point chosen for determining $Z_{RL}$ should therefore be such that the quiescent voltages between each of said transmission conductors and said return conductor have values which may appear at a given point in time under normal operation.

A termination circuit used in a device for implementing the method of the invention may be such that it behaves as a linear circuit for the interconnection. Consequently, said at least one termination circuit coupled to said return conductor and to each of said transmission conductors may be such that said at least one termination circuit is, in said part of said known frequency band, when said at least one termination circuit is in the activated state, approximately characterized, for said interconnection, by an impedance matrix with respect to the return conductor, said impedance matrix with respect to the return conductor being a matrix of size n×n.

In a device for implementing the method of the invention, it is possible that the number m of transmission channels between one of said transmitting circuits and one of said receiving circuits is equal to the number n of transmission conductors. Such a device is preferred because it provides the largest number of transmission channels for a given interconnection. However, it is also conceivable to use a number n of transmission conductors greater than the number m of transmission channels. In particular, n may be greater than or equal to three.

A device for implementing the method of the invention, thanks to the characteristics specified for the interconnection and for the terminations, uses the return conductor as a return path for the return current produced by the currents flowing in the n transmission conductors, like the inventions described in said French patent applications number 07/05260, number 08/04429 and number 08/04430, and the corresponding international applications. Moreover, the return conductor as defined in the invention is used by the receiving circuits for delivering the "output signals of the receiving circuit". Consequently, it is appropriate to consider that the method of the invention and the device for implementing the method of the invention are pseudo-differential.

In a device for implementing the method of the invention, it is possible that each of said termination circuits is arranged at an end of said interconnection. This arrangement is preferred because specialists understand that it is the best technique for eliminating reflections of signals propagating in said (n+1)-conductor multiconductor transmission line.

A device for implementing the method of the invention may be such that said termination circuits, said transmitting circuits and said receiving circuits are without any part in common to any two of them. Conversely, a device for implementing the method of the invention may be such that said termination circuits, said transmitting circuits and said receiving circuits are not without any part in common to any two of them.

A device for implementing the method of the invention may be such that at least one said termination circuit is made of a network of resistors, n of said resistors being each connected between one of said transmission conductors and said return conductor. For n=4, non-limiting examples of such termination circuits are shown in FIG. 2 and FIG. 3 (FIG. 2 and FIG. 3 being presented above, in the prior art section). In the second circumstance and in the third circumstance, said network of resistors may further comprise at least one resistor connected between two of said transmission conductors. For n=4, a non-limiting example of such a termination circuit is shown in FIG. 3.

A termination circuit made of a network of resistors is however not at all a characteristic of the invention. By way of a first example, designers may, in order to reduce the power consumed by one of said termination circuits, choose to allow this termination circuit to be effective only in a relevant interval of frequencies, for instance by including suitable reactive circuit elements in this termination circuit. By way of a second example, one of said termination circuits could include active components, for instance insulated gate field-effect transistors (MOSFETs) operating in the ohmic regime. The impedance of the channel of such components may be adjustable by electrical means. Consequently, a device for implementing the method of the invention may be such that the impedance matrix with respect to the return conductor, of at least one said termination circuit in the activated state, can be adjusted by electrical means.

In the case where one of said termination circuits has an activated state and a deactivated state, the impedance of the channel of one or more MOSFETs may for instance be controlled by one or more control signals taking on different values in the activated state and in the deactivated state. Consequently, at least one of said termination circuits may be such that said termination circuit has an activated state and a deactivated state, the impedance matrix, with respect to the return conductor, of said termination circuit in the activated state being different from the impedance matrix, with respect to the return conductor, of said termination circuit in the deactivated state.

In the case where one of said termination circuits has an activated state and a deactivated state, components such as transistors may for instance be used as switches having a closed state and an open state. In this case, said transistors may for instance be in the closed state when this termination circuit is in the activated state, and be in the open state when this termination circuit is in the deactivated state. Consequently, it is possible that at least one said termination circuit has an activated state and a deactivated state, each current flowing from said at least one said termination circuit to one of said transmission conductors being substantially zero when said at least one said termination circuit is in the deactivated state. Designers may, in order to reduce the power consumed by such a termination circuit, choose to put this termination circuit in the deactivated state when a transmitting circuit close to the termination circuit is in the activated state.

In the first circumstance, a design target for a transmitting circuit or a receiving circuit is the creation of independent channels, one transmission conductor being allocated to each channel. In the second circumstance, for the design of a transmitting circuit or of a receiving circuit, it is possible to use the design equations presented in the Section V of said article entitled "A New Method for the Reduction of Crosstalk and Echo in Multiconductor Interconnections", even though this paper only considers the case where a uniform multiconductor transmission line can be used to model an interconnection which does not comprise a return conductor. In the third circumstance, for the design of a transmitting circuit or of a receiving circuit, it is possible to use the design equations presented in the Table I of the article of F. Broydé and E. Clavelier entitled "Echo-Free and Crosstalk-Free Transmission in Particular Interconnections", published in the *IEEE Microwave and Wireless Components Letters*, Vol. 19, No. 4, April 2009, pages 209 to 211, even though this paper only considers the case where a uniform multiconductor transmission line can be used to model an interconnection which does not comprise a return conductor.

According to the invention, at least one termination circuit is such that $Z_{RL}$ is a matrix of size n×n. This implies that this termination circuit in the activated state approximately behaves, for the interconnection, as if it was not connected to said reference conductor. However, a device for implementing the method of the invention may further comprise one or more damping circuits coupled to said return conductor and to the reference conductor.

We observe that the combination of such a damping circuit and of one of said termination circuits in the activated state presents, with respect to the reference conductor, at any frequency in said part of said known frequency band, an impedance matrix which is a non-diagonal matrix of size (n+1)×(n+1).

A device for implementing the method of the invention may be such that none of said damping circuits has any part in common with one of said receiving circuits and/or with one of said termination circuits and/or with one of said transmitting circuits. Conversely, a device for implementing the method of the invention may be such that one or more of said damping circuits has one or more parts in common with one of said receiving circuits and/or with one of said termination circuits and/or with one of said transmitting circuits.

According to the invention, one or more of said transmitting circuits and/or one or more of said receiving circuits may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device for implementing the method of the invention, using an equalization reducing the effects of the distortions caused by propagation, said equalization being implemented in one or more of said transmitting circuits and/or in one or more of said receiving circuits. This type of processing, which is also sometimes referred to as compensation, is well known to specialists and may be implemented using analog signal processing or digital signal processing.

Specialists know that it is commonplace to use adaptive algorithms for implementing this type of processing in receivers for data transmission. A device for implementing the method of the invention may use an adaptive equalization. This type of processing is well known to specialists and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 5:
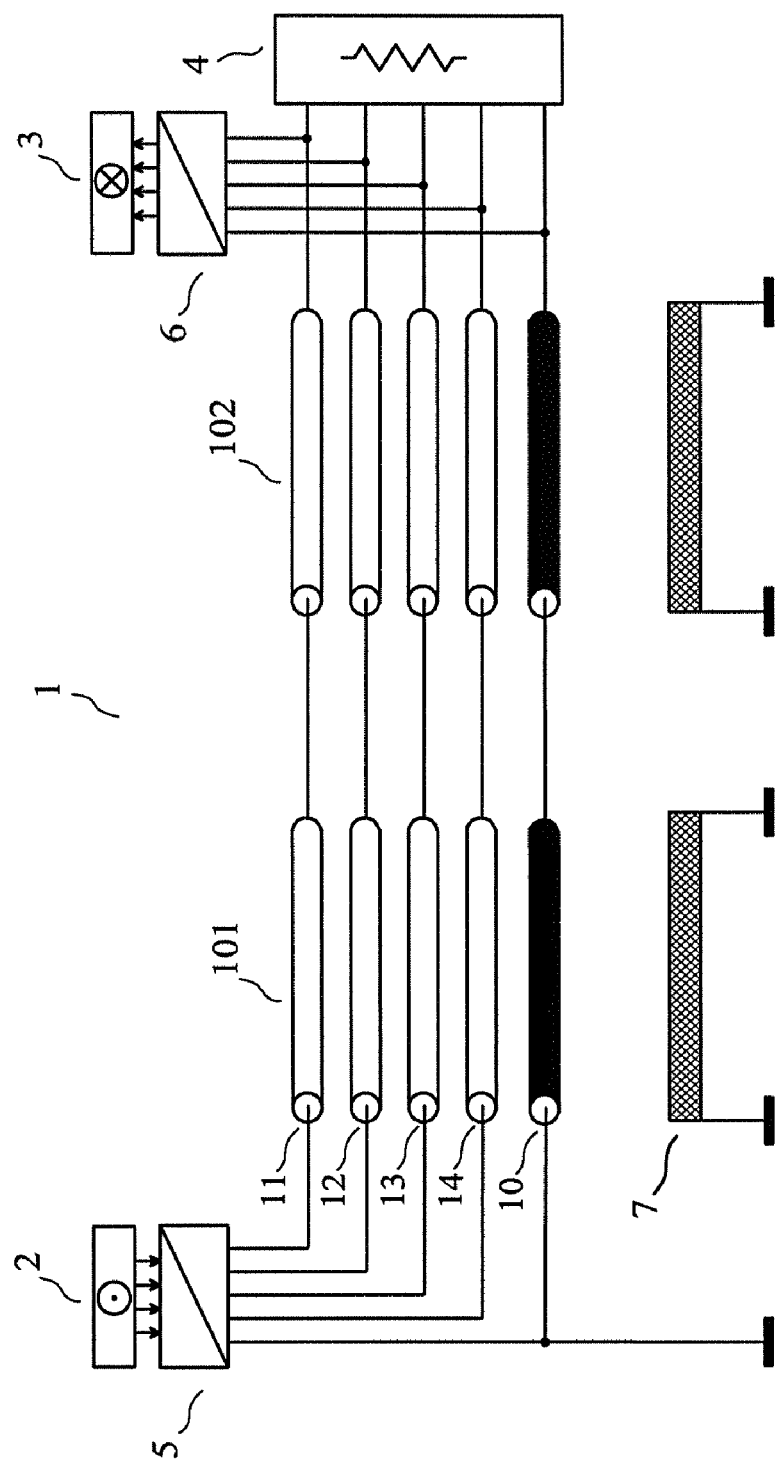
FIG. 5 shows a first embodiment of the invention.

As a first embodiment of a device for implementing the method of the invention, given by way of non-limiting example, we have represented in FIG. 5 a device of the invention comprising an interconnection (1) having n=4 transmission conductors (11) (12) (13) (14) and a return conductor (10) distinct from a reference conductor (7). A transmitting circuit (5) receives at its input the m=4 "input signals of the transmitting circuit" from the m channels of the source (2). The transmitting circuit (5) comprises n output terminals which are connected to the transmission conductors (11) (12) (13) (14) of the interconnection (1), at the near-end of the interconnection (1). The return conductor (10) is grounded at the near-end of the interconnection (1). A termination circuit (4) is connected to the conductors (10) (11) (12) (13) (14) of the interconnection (1), at the far-end of the interconnection (1). A receiving circuit (6) has its n+1 input terminals connected to the conductors (10) (11) (12) (13) (14) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

Figure 6:
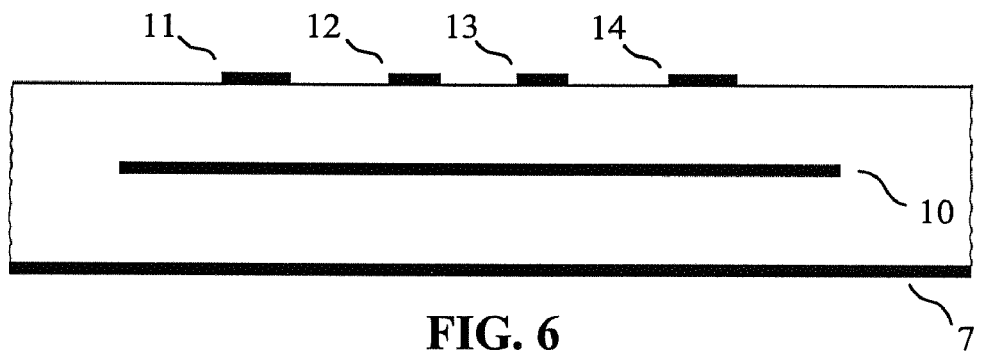
FIG. 6 shows a cross section of the interconnection used in the first embodiment.

The interconnection (1) is subdivided into 2 interconnection segments (101) (102). The FIG. 6 shows a section of the interconnection (1) and of the reference conductor (7) in a plane orthogonal to the direction of propagation, at a given abscissa z in any one of said interconnection segments (101) (102), this cross section corresponding to the "coplanar-strips-over-return-conductor" structure defined in said papers entitled "A new pseudo-differential transmission scheme for on-chip and on-board interconnections" and "Pseudo-differential links using a wide return conductor and a floating termination circuit". In this structure, the return conductor (10) is a copper area and the transmission conductors (11) (12) (13) (14) are traces which are clearly closer to the return conductor (10) than to the reference conductor (7). The FIG.

9 shows the same cross section, with indication of several dimensional parameters, denoted by $s_1$, $s_2$, $w_1$, $w_2$, v, h, H, t and T. In any one of said interconnection segments (101) (102), the permittivity of the dielectrics does not depend on the abscissa z along the interconnection and each of said dimensional parameters takes on a fixed value. Thus, each of said interconnection segments (101) (102) is such that it may be modeled, to a sufficient accuracy in a part of the frequency band used for transmission, as a (n+1)-conductor uniform multiconductor transmission line, said multiconductor transmission line using the natural voltages referenced to the return conductor and the natural currents as natural electrical variables.

Consequently, the interconnection (1) may be modeled, to a sufficient accuracy in said part of the frequency band used for transmission, as a (n+1)-conductor multiconductor transmission line, said multiconductor transmission line using the natural voltages referenced to the return conductor and the natural currents as natural electrical variables. The permittivity of the dielectrics is significantly different in the different interconnection segments (101) (102). Consequently, it has not been possible to proportion the interconnection segments (101) (102) such that the (n+1)-conductor multiconductor transmission line used to model the whole interconnection is a uniform multiconductor transmission line. Thus, the (n+1)-conductor multiconductor transmission line used to model the whole interconnection has a per-unit-length impedance matrix (also referred to as "per-unit-length impedance matrix with respect to the return conductor" and denoted by $Z_R$) and a per-unit-length admittance matrix (also referred to as "per-unit-length admittance matrix with respect to the return conductor" and denoted by $Y_R$) which cannot be considered as both uniform over the length of said (n+1)-conductor multiconductor transmission line.

However, even though the dimensional parameters h, H, t and T are not free in this particular design (they are determined by the technological requirements applicable to each of said interconnection segments), the dimensional parameters $s_1$, $s_2$, $w_1$, $w_2$ and v may easily be proportioned by a specialist, so as to obtain substantially the same characteristic impedance matrix with respect to the return conductor, denoted by $Z_{RC}$, for each of said interconnection segments (101) (102). More precisely, the characteristic impedance matrix with respect to the return conductor applicable to the first segment (101), denoted by $Z_{RC1}$, and the characteristic impedance matrix with respect to the return conductor applicable to the second segment (102), denoted by $Z_{RC2}$, are such that a suitable norm of $Z_{RC1}-Z_{RC2}$ is sufficiently small, so that we may for instance define $Z_{RC}$ as $Z_{RC}=(Z_{RC1}+Z_{RC2})/2$. Thus, the characteristic impedance matrix of the (n+1)-conductor multiconductor transmission line used to model the whole interconnection (1) is substantially uniform over the length of said multiconductor transmission line. The characteristic impedance matrix with respect to the return conductor $Z_{RC}$ is given by $$Z_{RC} \approx \begin{pmatrix} 54.77 & 4.47 & 0.38 & 0.03 \\ 4.47 & 54.60 & 4.45 & 0.38 \\ 0.38 & 4.45 & 54.60 & 4.47 \\ 0.03 & 0.38 & 4.47 & 54.77 \end{pmatrix} \Omega \quad (24)$$

The termination circuit (4) is such that, in said part of the frequency band used for transmission, the impedance matrix with respect to the return conductor of the termination circuit, denoted by $Z_{RL}$, is a diagonal matrix of size n×n. The specialist understands that the termination circuit (4) behaves as if it was not connected to ground. Consequently, there is no constraint on the manner of routing the interconnection (1) with respect to ground (7).

In order to optimize the diagonal matrix $Z_{RL}$ defined above, the designer may choose to minimize the matrix norm $\|P_R\|_\infty$ of the matrix of the voltage reflection coefficients of the termination circuit with respect to the return conductor, this matrix norm being equal to the largest sum of the absolute values of the components of a row. In this manner, the designer obtains $$Z_{RL} \approx \begin{pmatrix} 58.8 & 0.0 & 0.0 & 0.0 \\ 0.0 & 54.2 & 0.0 & 0.0 \\ 0.0 & 0.0 & 54.2 & 0.0 \\ 0.0 & 0.0 & 0.0 & 58.8 \end{pmatrix} \Omega \quad (25)$$

for which $\|P_R\|_\infty \approx 0.082$. Consequently, the termination circuit (4) may be made of:
two resistors of about 58.8Ω, each of these resistors being connected between one of the transmission conductors (11) (14) number 1 or 4 and the return conductor; and
two resistors of about 54.2Ω, each of these resistors being connected between one of the transmission conductors (12) (13) number 2 or 3 and the return conductor.

The transmitting circuit (5) delivers n transmission variables, each of said transmission variables being a voltage between an output terminal of the transmitting circuit (5) and ground. Since the return conductor (10) is grounded at the near-end of the interconnection (1), we can say that each of said transmission variables is one of the natural voltages referenced to the return conductor. Each of said transmission variables delivered by said transmitting circuit (5) is mainly determined by one and only one of said m "input signals of the transmitting circuit".

For instance, said transmitting circuit (5) may be made of four single-input and single-output line drivers, each of the line drivers presenting a sufficiently low output impedance.

Figure 1:
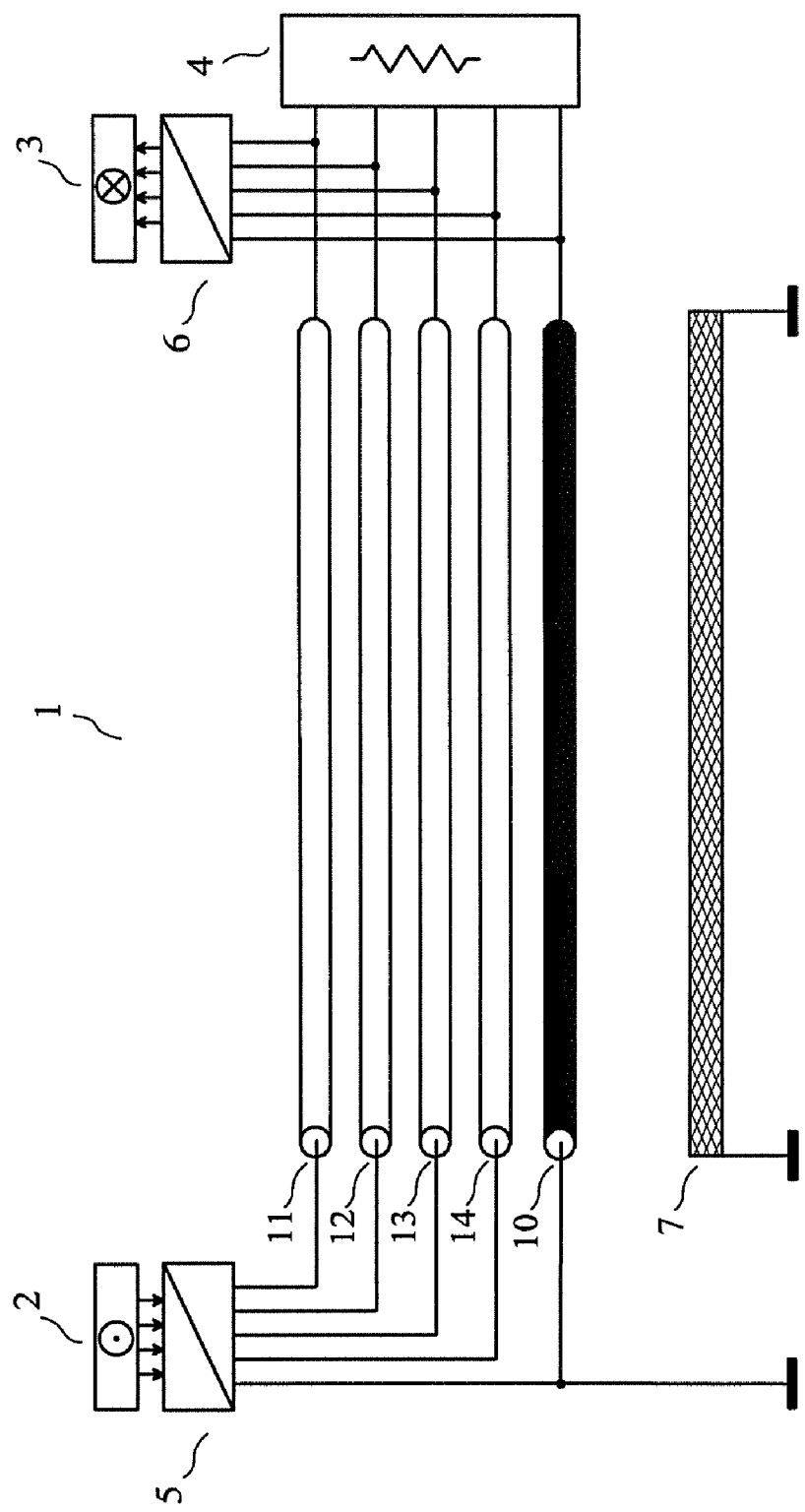
FIG. 1 shows a pseudo-differential transmission device comprising an interconnection having four transmission conductors, and has already been discussed in the section dedicated to the presentation of prior art.
Figure 2:
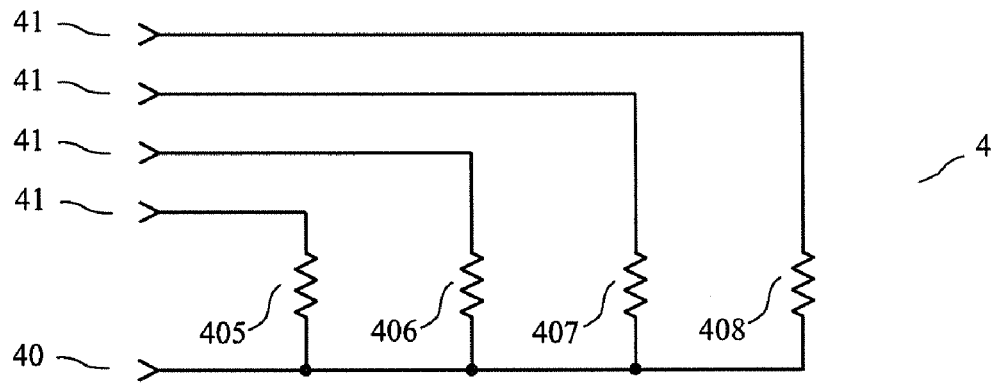
FIG. 2 shows a first termination circuit which may be used in a pseudo-differential transmission device, and has already been discussed in the section dedicated to the presentation of prior art.
Figure 3:
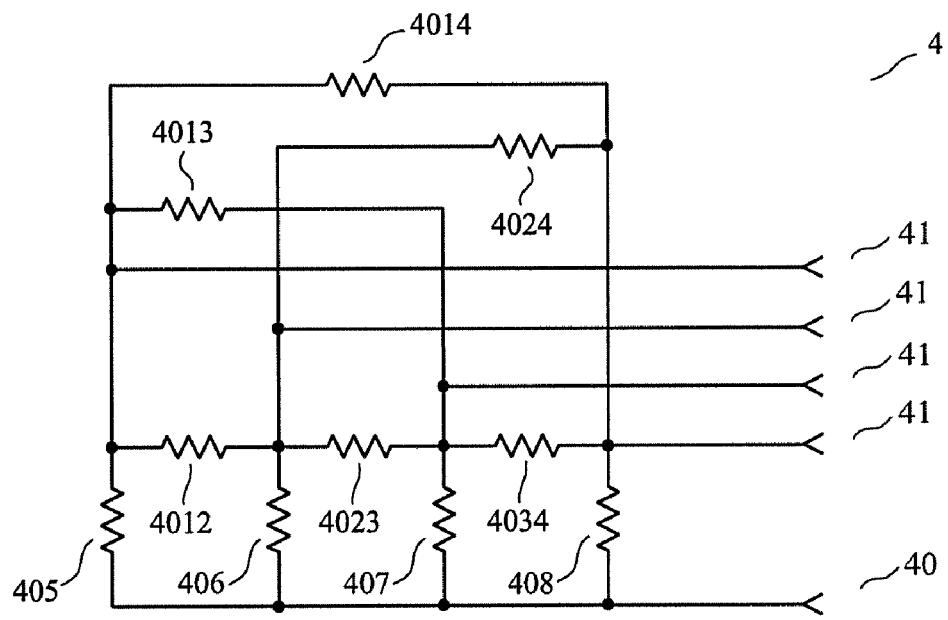
FIG. 3 shows a second termination circuit which may be used in a pseudo-differential transmission device, and has already been discussed in the section dedicated to the presentation of prior art.

The receiving circuit (6) delivers m "output signals of the receiving circuit", each of said "output signals of the receiving circuit" being mainly determined by one and only one of said natural voltages referenced to the return conductor. For instance, the receiving circuit (6) may be identical to the pseudo-differential receiving circuit shown in FIG. 2 of the French patent application number 08/03830 of 7 Jul. 2008, entitled "Circuit de reception pseudo-différentiel", corresponding to the international application number PCT/IB2009/051053 of 13 Mar. 2009 (WO 2010/004442), entitled "Pseudo-differential receiving circuit".

This first embodiment is suitable for the transmission of analog signals and for the transmission of digital signals.

Second Embodiment

Figure 12:
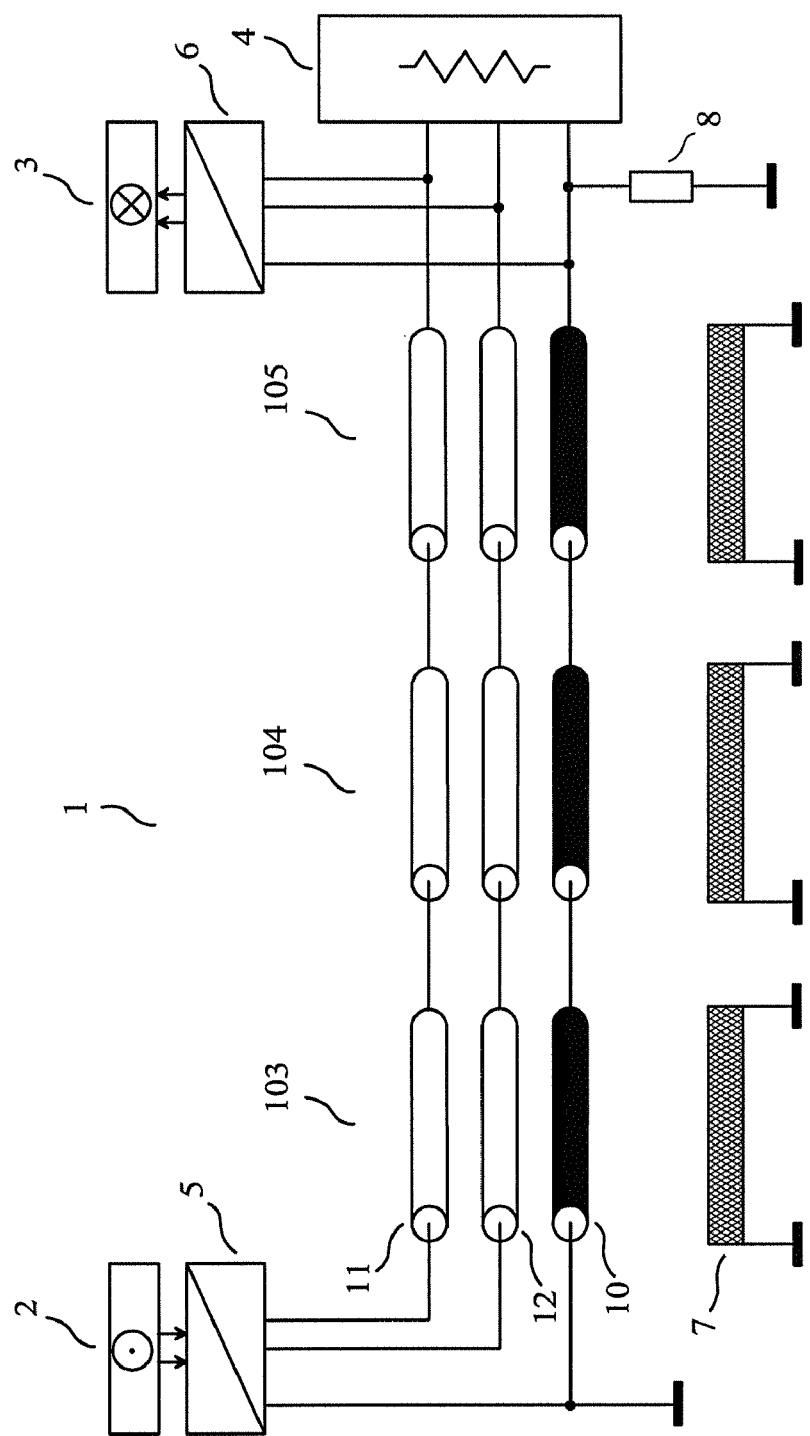
FIG. 12 shows the second embodiment of the invention.

As a second embodiment of a device for implementing the method of the invention, given by way of non-limiting example, we have represented in FIG. 12 a device of the invention comprising an interconnection (1) having n=2 transmission conductors (11) (12) and a return conductor (10) distinct from a reference conductor (7). A transmitting circuit (5) receives at its input the m=2 "input signals of the transmitting circuit" from the m channels of the source (2). The transmitting circuit (5) comprises n output terminals which are connected to the transmission conductors (11) (12) of the interconnection (1), at the near-end of the interconnection (1). The return conductor (10) is grounded at the near-end of the interconnection (1). A termination circuit (4) is connected to the conductors (10) (11) (12) of the interconnection (1), at the far-end of the interconnection (1). A receiving circuit (6) has its n+1 input terminals connected to the conductors (10) (11) (12) of the interconnection (1), at the far-end of the interconnection (1). The output of the receiving circuit (6) delivers in "output signals of the receiving circuit" to the destination (3). Thus, the analog or digital signals of the m channels of the source (2) are sent to the in channels of the destination (3).

Figure 7:
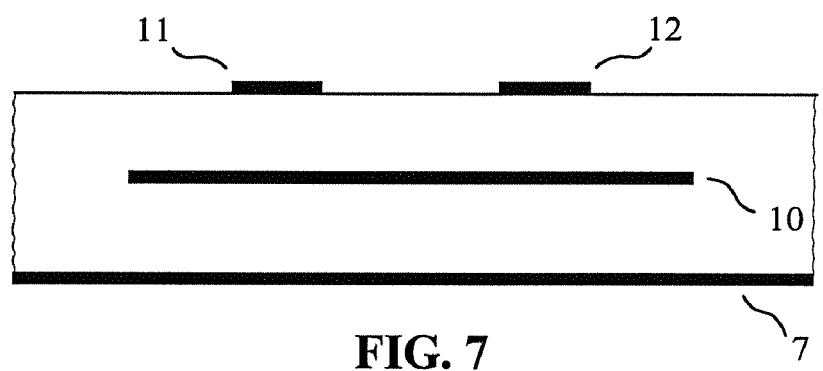
FIG. 7 shows a cross section of the interconnection used in a second embodiment.
Figure 10:
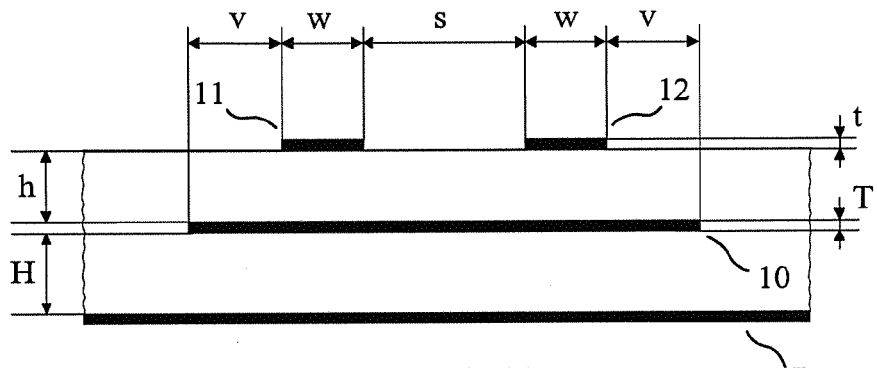
FIG. 10 shows a cross section of the interconnection used in the second embodiment, with indication of several dimensional parameters.

The interconnection (1) is subdivided into 3 interconnection segments (103) (104) (105). The FIG. 7 shows a section of the interconnection (1) and of the reference conductor (7) in a plane orthogonal to the direction of propagation, at a given abscissa z in any one of said interconnection segments (103) (104) (105), this cross section corresponding to said "coplanar-strips-over-return-conductor structure". In this structure, the return conductor (10) is a copper area and the transmission conductors (11) (12) are traces which are clearly closer to the return conductor (10) than to the reference conductor (7). The FIG. 10 shows the same cross section, with indication of several dimensional parameters, denoted by s, w, v, h, H, t and T. In any one of said interconnection segments (103) (104) (105), the permittivity of the dielectrics does not depend on the abscissa z along the interconnection and each of said dimensional parameters takes on a fixed value. Thus, each of said interconnection segments (103) (104) (105) is such that it may be modeled, to a sufficient accuracy in a part of the frequency band used for transmission, as a (n+1)-conductor uniform multiconductor transmission line, said multiconductor transmission line using the natural voltages referenced to the return conductor and the natural currents as natural electrical variables.

Consequently, the interconnection (1) may be modeled, to a sufficient accuracy in said part of the frequency band used for transmission, as a (n+1)-conductor multiconductor transmission line, said multiconductor transmission line using the natural voltages referenced to the return conductor and the natural currents as natural electrical variables. The permittivity of the dielectrics is significantly different in the first two interconnection segments (103) (104) and also in the last two interconnection segments (104) (105). Consequently, it has not been possible to proportion the interconnection segments (103) (104) (105) such that the (n+1)-conductor multiconductor transmission line used to model the whole interconnection is a uniform multiconductor transmission line. Thus, the (n+1)-conductor multiconductor transmission line used to model the whole interconnection has a per-unit-length impedance matrix (denoted by $Z_R$) and a per-unit-length admittance matrix (denoted by $Y_R$) which cannot be considered as both uniform over the length of said (n+1)-conductor multiconductor transmission line.

However, even though the dimensional parameters h, H, t and T are not free in this particular design, the dimensional parameters s, w and v may easily be proportioned by a specialist, so as to obtain the same characteristic impedance matrix with respect to the return conductor (denoted by $Z_{RC}$) for each of said interconnection segments (103) (104) (105). Thus, the characteristic impedance matrix of the (n+1)-conductor multiconductor transmission line used to model the whole interconnection (1) is uniform over the length of said multiconductor transmission line. $Z_{RC}$ is given by $$Z_{RC} = \begin{pmatrix} 147 & 60 \\ 60 & 147 \end{pmatrix} \Omega \quad (26)$$

The termination circuit (4) is such that, in said part of the frequency band used for transmission, the impedance matrix, with respect to the return conductor, of the termination circuit is a non-diagonal matrix of size n ×n approximately equal to $Z_{RC}$.

In this second embodiment, at each abscissa z along said (n+1)-conductor multiconductor transmission line, in said part of said known frequency band, there exists a non-singular matrix $S_R$ such that $S_R^{-1} Z_R Y_R {}^t S_R$ is a diagonal matrix, said matrix $S_R$ being independent of the abscissa z along said (n+1)-conductor multiconductor transmission line. Because of the symmetry of the interconnection (1), we may for instance use $$S_R = \begin{pmatrix} 1 & 1 \\ -1 & 1 \end{pmatrix} \quad (27)$$

which defines a differential mode and a common-mode.

The transmitting circuit (5) delivers n transmission variables, each of said transmission variables being a voltage between an output terminal of the transmitting circuit (5) and ground. Each output terminal of the transmitting circuit (5) presents a low impedance with respect to ground. Since the return conductor (10) is grounded at the near-end of the interconnection (1), we can say that each of said transmission variables is one of the natural voltages referenced to the return conductor. Consequently, each of said transmission variables is a natural electrical variable of said (n+1)-conductor multiconductor transmission line used to model the interconnection. Each of said transmission variables delivered by said transmitting circuit (5) is a linear combination of signals each mainly determined by one and only one of said m "input signals of the transmitting circuit", such that the output of said transmitting circuit (5) delivers modal voltages defined by $S_R$, each of said modal voltages being mainly determined by one and only one of said "input signals of the transmitting circuit". Thus, the equation (22) is applicable to the operation of the transmitting circuit (5) and $V_{RM}$ produced by the transmitting circuit (5) is determined, at each point in time, by the history, up to said point in time, of said "input signals of the transmitting circuit".

For instance, the transmitting circuit (5) may be similar to one of the transmitting circuits used in the embodiments of the French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk", for instance to the transmitting circuit used in FIG. 7 of the French patent number 0300064 and the corresponding international application. For instance, the transmitting circuit (5) may be similar to one of the transmitting circuits used in the embodiments of the French patent number 0302814 of 6 Mar. 2003 entitled "Procédé et dispositif numériques pour la transmission avec une faible diaphonie", corresponding to the international application number PCT/EP2004/002382 of 18 February 2004 (WO 2004/079941), entitled "Digital method and device for transmission with reduced crosstalk".

The receiving circuit (6) delivers m "output signals of the receiving circuit", each of said "output signals of the receiving circuit" being mainly determined by one and only one of said modal voltages defined by the matrix $S_R$. Thus, the equation (23) is applicable to the operation of the receiving circuit (6) and said "output signals of the receiving circuit" are mainly determined, at each point in time, by the history, up to said point in time, of $V_{RM}$ at the input of the receiving circuit (6).

For instance, the receiving circuit (6) may be a receiving circuit disclosed in said French patent application number 08/03830 or in the corresponding international application.

In this second embodiment, a damping circuit (8) is connected between the return conductor (10) and ground, at the far-end of the interconnection (1). The damping circuit (8) consists of a resistor connected between the return conductor (10) and ground. The damping circuit (8) damps the resonances of the circuit consisting of the return conductor and of the reference conductor.

This second embodiment is suitable for the transmission of analog signals and for the transmission of digital signals.

Third Embodiment (Best Mode)

Figure 13:
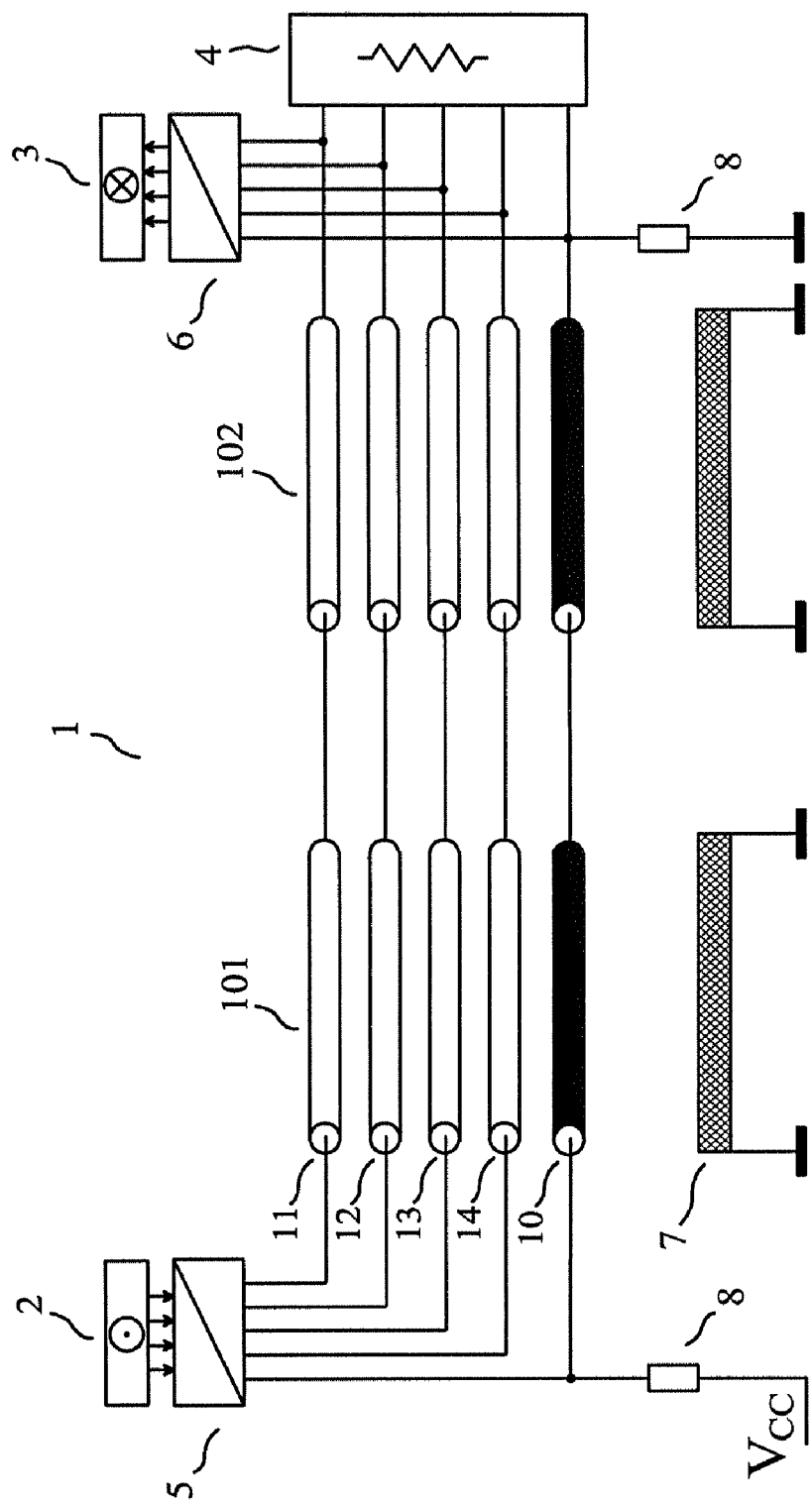
FIG. 13 shows the third embodiment of the invention.

As a third embodiment of a device for implementing the method of the invention, given by way of non-limiting example and best mode of carrying out the invention, we have represented in FIG. 13 a device of the invention comprising an interconnection (1) having n=4 transmission conductors (11) (12) (13) (14) and a return conductor (10) distinct from a reference conductor (7). A transmitting circuit (5) receives at its input the m=4 "input signals of the transmitting circuit" from the m channels of the source (2). The transmitting circuit (5) comprises n+1 output terminals which are connected to the conductors (10) (11) (12) (13) (14) of the interconnection (1), at the near-end of the interconnection (1). A termination circuit (4) is connected to the conductors (10) (11) (12) (13) (14) of the interconnection (1), at the far-end of the interconnection (1). A receiving circuit (6) has its n+1 input terminals connected to the conductors (10) (11) (12) (13) (14) of the interconnection (1), at the far-end of the interconnection (1). The output of the receiving circuit (6) delivers m "output signals of the receiving circuit" to the destination (3). Thus, the analog or digital signals of the m channels of the source (2) are sent to the m channels of the destination (3).

Figure 8:
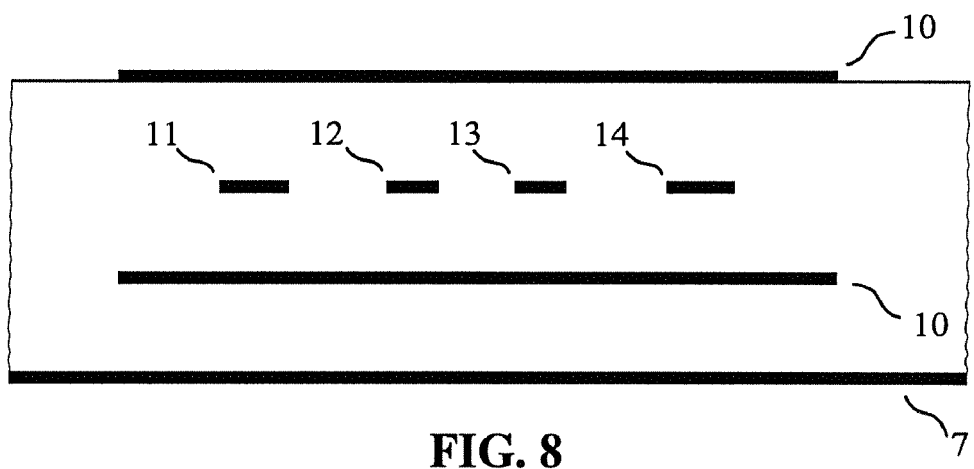
FIG. 8 shows a cross section of the interconnection used in a third embodiment.
Figure 9:
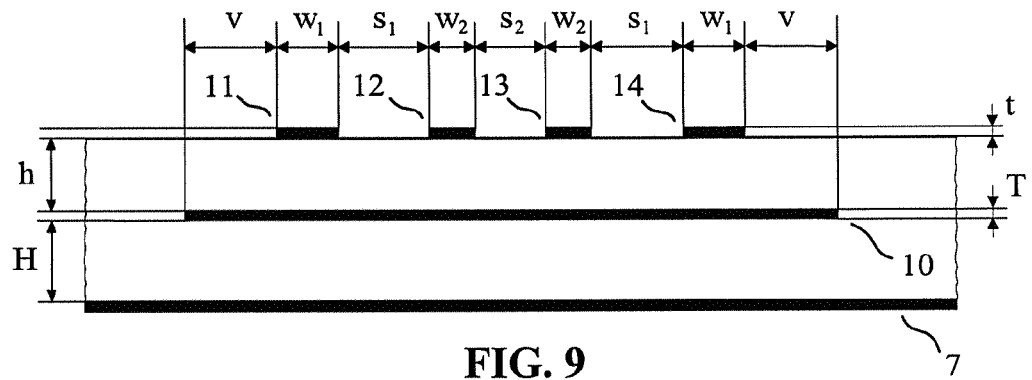
FIG. 9 shows a cross section of the interconnection used in the first embodiment, with indication of several dimensional parameters.
Figure 11:
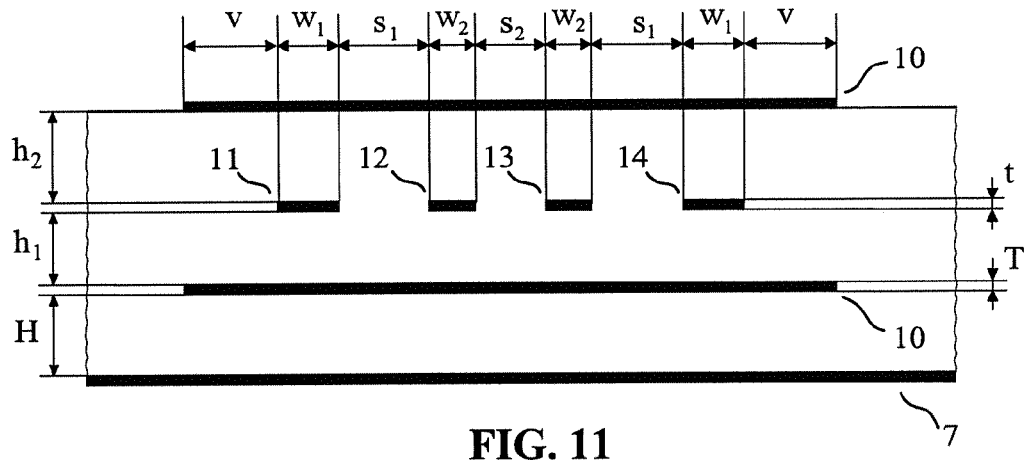
FIG. 11 shows a cross section of the interconnection used in the third embodiment, with indication of several dimensional parameters.

The interconnection (1) is subdivided into 2 interconnection segments (101) (102). The FIG. 8 shows a section of the interconnection (1) and of the reference conductor (7) in a plane orthogonal to the direction of propagation, at a given abscissa z in any one of said interconnection segments (101) (102), this cross section corresponding to the "coplanar-strips-inside-return-conductor" structure defined in said papers entitled "A new pseudo-differential transmission scheme for on-chip and on-board interconnections" and "Pseudo-differential links using a wide return conductor and a floating termination circuit". In this structure, the return conductor (10) is made of two interconnected copper areas and the transmission conductors (11) (12) (13) (14) are traces which are clearly closer to the return conductor (10) than to the reference conductor (7). The FIG. 11 shows the same cross section, with indication of several dimensional parameters, denoted by $s_1$, $s_2$, $w_1$, $w_2$, v, $h_1$, $h_2$, H, t and T. In any one of said interconnection segments (101)(102), the permittivity of the dielectrics does not depend on the abscissa z along the interconnection and each of said dimensional parameters takes on a fixed value. Thus, each of said interconnection segments (101) (102) is such that it may be modeled, to a sufficient accuracy in a part of the frequency band used for transmission, as a (n+1)-conductor uniform multiconductor transmission line, said multiconductor transmission line using the natural voltages referenced to the return conductor and the natural currents as natural electrical variables.

The permittivity of the dielectrics being significantly different in the different interconnection segments (101) (102), the interconnection (1) may be modeled, to a sufficient accuracy in said part of the frequency band used for transmission, as a (n+1)-conductor multiconductor transmission line, said multiconductor transmission line using the natural voltages referenced to the return conductor and the natural currents as natural electrical variables, said multiconductor transmission line having a per-unit-length impedance matrix with respect to the return conductor (denoted by $Z_R$) and a per-unit-length admittance matrix with respect to the return conductor (denoted by $Y_R$) which cannot be considered as both uniform over the length of said (n+1)-conductor multiconductor transmission line.

However, even though the dimensional parameters $h_1$, $h_2$, H, t and T are not free in this particular design, the dimensional parameters $s_1$, $s_2$, $w_1$, $w_2$ and v may easily be proportioned by a specialist, so as to obtain substantially the same characteristic impedance matrix with respect to the return conductor (denoted by $Z_{RC}$) for each of said interconnection segments (101) (102). Thus, the characteristic impedance matrix of the (n+1)-conductor multiconductor transmission line used to model the whole interconnection (1) is uniform (or substantially uniform) over the length of said multiconductor transmission line.

The termination circuit (4) is such that, in said part of the frequency band used for transmission, the impedance matrix, with respect to the return conductor, of the termination circuit is a non-diagonal matrix of size n x n approximately equal to $Z_{RC}$.

Because of the "coplanar-strips-inside-return-conductor" structure used in this third embodiment, the interconnection (1) is such that, at each point along said (n+1)-conductor multiconductor transmission line, in said part of the frequency band used for transmission, the product $Z_R Y_R$ may be considered as equal to the product of a scalar and the identity matrix of order n, so that equation (16) is applicable.

The transmitting circuit (5) is a device disclosed in the French patent application number 08/03985 of 11 Jul. 2008, entitled "Dispositif d'interface multicanal avec circuit d'équilibrage", corresponding to the international application number PCT/IB2009/051557 of 14 Apr. 2009 (WO 2010/004448), entitled "Multichannel interfacing device having a balancing circuit", having n signal terminals and a common terminal, each of said signal terminals being connected to one and only one of said transmission conductors, each of said transmission conductors being connected to one and only one of said signal terminals, said common terminal being connected to said return conductor.

The transmitting circuit (5) delivers n transmission variables, each of said transmission variables being a current flowing out of a signal terminal of the transmitting circuit (5). Since the return conductor (10) is connected to said common terminal of the transmitting circuit (5), said return conductor (10) is used as a return path for the return current produced by the currents flowing in the n transmission conductors (11) (12) (13) (14). Consequently, each of said transmission variables is a natural electrical variable of said (n+1)-conductor multiconductor transmission line used to model the interconnection. Here, each of said natural electrical variables, delivered by said transmitting circuit and determined by one and only one of said "input signals of the transmitting circuit", is one of said natural voltages referenced to the return conductor, as is the case in the second embodiment of said French patent application number 08/04430 and of the corresponding international application.

The receiving circuit (6) may be identical to the one used in the first embodiment.

In this third embodiment, there is only one termination circuit (4) because the signals are intended to propagate in a single direction, and because a single termination sufficiently reduces reflections.

In this third embodiment, two damping circuits (8) are each connected between the return conductor (10) and a node held at a constant voltage with respect to a reference terminal. For the first damping circuit, which consists of a resistor, this node is a power supply terminal having a constant voltage with respect to a reference node. The second damping circuit, which consists of a branch comprising a capacitor connected in series with a resistor, is directly connected to a reference node. We note that it would be possible to consider that the first damping circuit is a part of the transmitting circuit (5) and/or that the second damping circuit is a part of the receiving circuit (6).

This third embodiment is suitable for the transmission of analog signals and for the transmission of digital signals.

In the second embodiment, we have considered an interconnection which is subdivided into 3 interconnection segments and, in the third embodiment, we have considered an interconnection which is subdivided into 2 interconnection segments. However, in both of these embodiments, we could have considered an interconnection which is subdivided into p interconnection segments, where p is an integer greater than or equal to 2, each of said interconnection segments being such that said each of said interconnection segments may be modeled, to a sufficient accuracy in a part of the frequency band used for transmission, as a (n+1)-conductor uniform multiconductor transmission line, said multiconductor transmission line using the natural voltages referenced to the return conductor and the natural currents as natural electrical variables.

Fourth Embodiment

Figure 14:
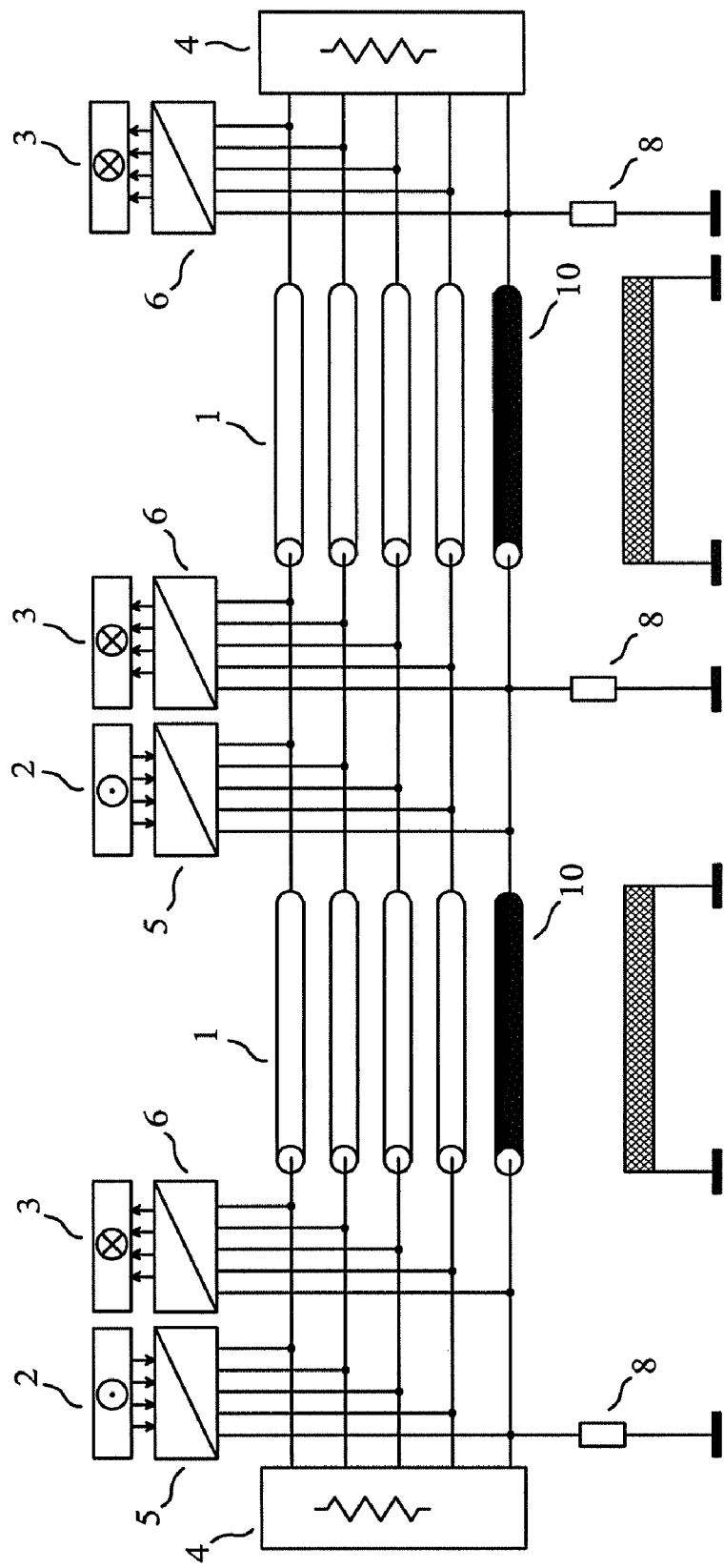
FIG. 14 shows a fourth embodiment of the invention.

As a fourth embodiment of a device for implementing the method of the invention, given by way of non-limiting example, we have represented in FIG. 14 a device of the invention comprising an interconnection (1) having n=4 transmission conductors and a return conductor (10) distinct from the reference conductor. The interconnection (1) cannot be modeled as a uniform multiconductor transmission line, but, taking into account the lumped impedances seen by the interconnection (1) and caused by the circuits connected to the interconnection (1) elsewhere than at the ends of the interconnection (1), it can be modeled as a (n+1)-conductor non-uniform multiconductor transmission line, said multiconductor transmission line using the natural voltages referenced to the return conductor and the natural currents as natural electrical variables, said multiconductor transmission line being such that the characteristic impedance matrix of said multiconductor transmission line is substantially uniform along said multiconductor transmission line. At each end of the interconnection (1), a termination circuit (4) is connected to the conductors of the interconnection (1). Each termination circuit (4) is such that the impedance matrix of the termination circuit with respect to the return conductor is, in a part of the frequency band used for transmission, a non-diagonal matrix of size n×n approximately equal to said characteristic impedance matrix. Two transmitting circuits (5) placed at two different abscissa z receive at their inputs the signals from the m=4 channels of the two sources (2). Each of said transmitting circuits (5) comprises n+1 output terminals which are connected to the n+1 conductors of the interconnection (1). Three receiving circuits (6) are placed at three different abscissa z. The n+1 input terminals of each of said receiving circuits (6) are connected to the n+1 conductors of the interconnection (1). The output of each of said receiving circuits (6) delivers m "output signals of the receiving circuit" to a destination (3). Three damping circuits (8) are connected between the return conductor (10) and the reference conductor.

In FIG. 14, each of the transmitting circuits (5) is associated with a receiving circuit (6) placed at the same abscissa z as said each of the transmitting circuits (5). Each of said transmitting circuits (5) delivers, when said each of said transmitting circuits (5) is in the activated state, m modal electrical variables, each of said modal electrical variables being mainly determined by the signal of only one channel of the source (2) connected to said each of said transmitting circuits (5). Thus, each modal electrical variable is allocated to one and only one channel. We note that FIG. 14 shows a data bus architecture, and that the address and/or control lines needed to obtain the activated state of at most one transmitting circuit (5) at a given point in time are not shown in FIG. 14.

Each of the m "output signals of the receiving circuit" delivered by any one of the receiving circuits (6) is mainly determined by only one of the modal voltages appearing at the input of said any one of the receiving circuits (6). Thus, the signals of the m channels of a source (2) connected to a transmitting circuit (5) in the activated state are sent to the in channels of the destinations (3), without noticeable echo, internal crosstalk and external crosstalk.

We note that, in the device of FIG. 14, the transmitting circuits (5) and the receiving circuits (6) being connected in parallel with the interconnection (1), they may, in order not to disturb the propagation of waves along the interconnection (1) in a detrimental way, and in order not to produce undesirable reflections at the ends of the interconnection (1), present high impedances to the interconnection (1). In the device of FIG. 14, two termination circuits (4) are necessary, because waves coming from the interconnection (1) may be incident on both ends.

This fourth embodiment is intended for transmitting digital signals. In FIG. 14, the bus architecture uses a direct connection of the transmitting circuits (5) and of the receiving circuits (6) to the interconnection (1). This is not a characteristic of the invention. For instance, according to the invention, one or more of the transmitting circuits (5) and/or one or more of the receiving circuits (6) may be coupled to the interconnection (1) using one or more electromagnetic couplers. This type of coupling is for instance described in the patent of the United States of America U.S. Pat. No. 7,080,186 entitled "Electromagnetically-coupled bus system". This type of indirect coupling may provide a higher transmission bandwidth.

Indications on Industrial Applications

The invention is suitable for pseudo-differential transmission between integrated circuits through an interconnection having two or more transmission conductors, the transmission presenting reduced echo and reduced external crosstalk.

Figure 4:
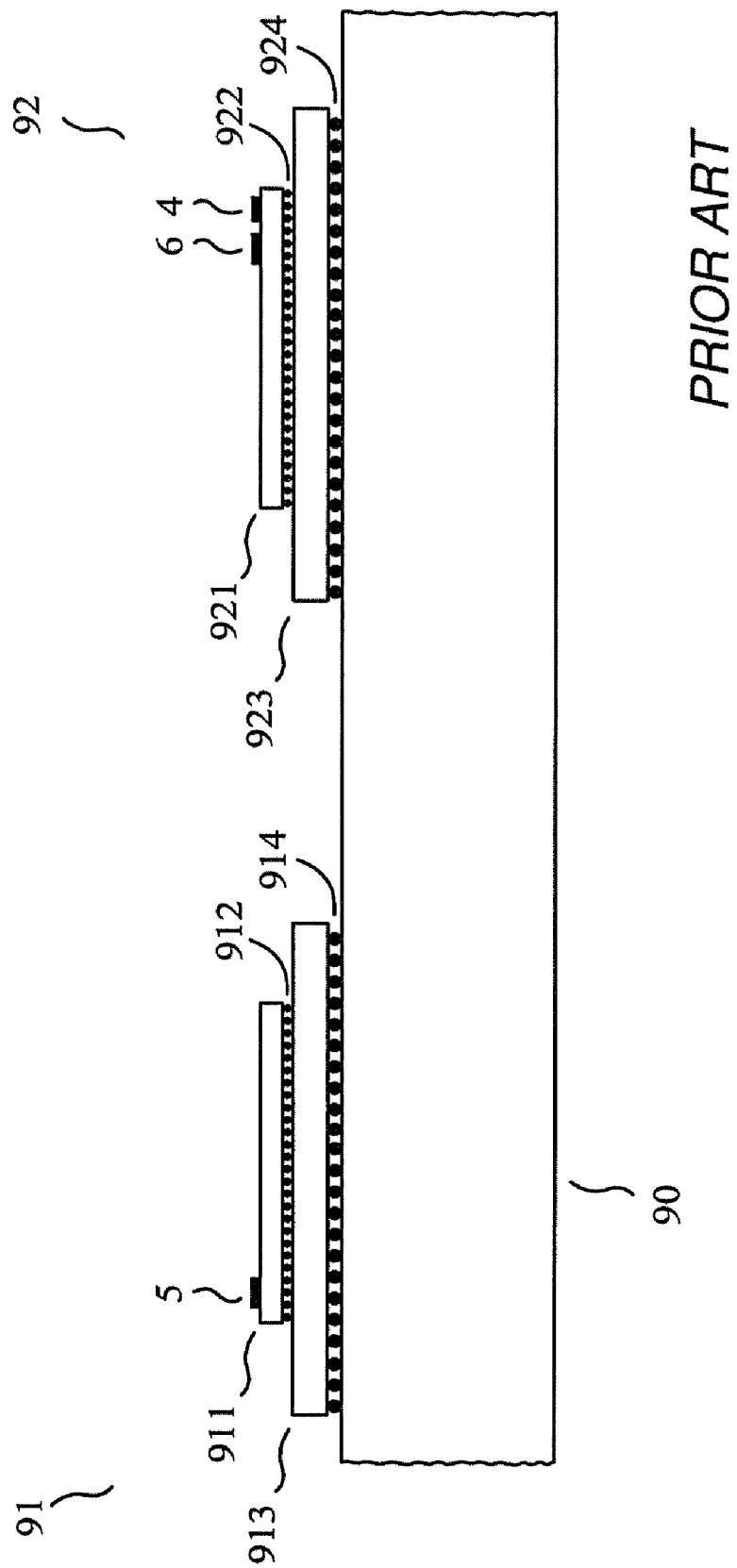
FIG. 4 shows the physical configuration of pseudo-differential transmission device, and has already been discussed in the section dedicated to the presentation of prior art.

The invention has the advantage of being applicable to interconnections which cannot be modeled as a uniform multiconductor transmission line, such as, for instance, the interconnection used in FIG. 4 and discussed in the prior art section. The invention is particularly advantageous for transmission inside a rigid or flexible printed circuit assembly or inside a multi-chip module (MCM), since in this context it is often not possible to use an interconnection which can be modeled as a uniform multiconductor transmission line at the highest frequencies of operation.

The invention is particularly suitable for pseudo-differential transmission inside an integrated circuit, because it provides a good protection against the noise related to the currents flowing in the reference conductor and in the substrate of the integrated circuit.

The invention is particularly suitable for multilevel signaling and for simultaneous bi-directional signaling, because such transmission schemes are more sensitive to noise than unidirectional binary signaling.

The invention claimed is:

1. A method for transmitting through an interconnection having n transmission conductors and a return conductor distinct from a reference conductor, n being an integer greater than or equal to 2, the method providing, in a known frequency band, m transmission channels each corresponding to a signal to be sent from an input of at least one transmitting circuit to an output of at least one receiving circuit, where m is an integer greater than or equal to 2 and less than or equal to n, the method comprising:

modeling the interconnection in a part of the known frequency band, taking into account the lumped impedances seen by the interconnection and caused by the circuits connected to the interconnection elsewhere than at the ends of the interconnection, as a (n+1)-conductor multiconductor transmission line, the multiconductor transmission line using natural voltages referenced to the return conductor and natural currents as natural electrical variables, the multiconductor transmission line having a per-unit-length impedance matrix and a per-unit-length admittance matrix which are not both uniform or substantially uniform over the length of the multiconductor transmission line, a characteristic impedance matrix of the multiconductor transmission line being substantially uniform over the length of the multiconductor transmission line; and coupling the terminals of at least one termination circuit to the return conductor and to each of the transmission conductors, the at least one termination circuit being, in the part of the known frequency band, approximately characterized, for the interconnection, by an impedance matrix with respect to the return conductor, the impedance matrix with respect to the return conductor being a matrix of size n×n.

2. The method of claim 1, wherein, in the part of the known frequency band, the impedance matrix with respect to the return conductor is substantially equal to a diagonal matrix, the method further comprising:

using one of the at least one transmitting circuit to receive m transmitting circuit input signals corresponding each to a transmission channel, an output of the one of the at least one transmitting circuit being coupled to at least m of the transmission conductors, the output of the one of the at least one transmitting circuit delivering natural electrical variables, each of the natural electrical variables being mainly determined by one and only one of the transmitting circuit input signals; and using one of the at least one receiving circuit to deliver m receiving signal output signals corresponding each to a transmission channel, an input of the one of the at least one receiving circuit being coupled to at least m of the transmission conductors and to the return conductor, each of the receiving circuit output signals being mainly determined by one and only one of the natural voltages referenced to the return conductor.

3. The method of claim 1, wherein, in the part of the known frequency band, the impedance matrix with respect to the return conductor is a non-diagonal matrix substantially equal to the characteristic impedance matrix, the method being such that, at each point along the multiconductor transmission line, in the part of the known frequency band, there exists an invertible matrix, denoted by S, such that the inverse of S times the per-unit-length impedance matrix times the per-unit-length admittance matrix times S is substantially a diagonal matrix, the matrix S being substantially uniform over the length of the multiconductor transmission line.

4. The method of claim 3, further comprising:

using one of the at least one transmitting circuit to receive m transmitting circuit input signals corresponding each to a transmission channel, the output of the one of the at least one transmitting circuit being coupled to the n transmission conductors, the output of the one of the at least one transmitting circuit delivering modal electrical variables defined by a transition matrix from modal electrical variables to natural electrical variables, the transition matrix from modal electrical variables to natural electrical variables being equal to the matrix S or to the inverse of the transpose of the matrix S, each of the modal electrical variables being mainly determined by one and only one of the transmitting circuit input signals; and using one of the at least one receiving circuit to deliver m receiving circuit output signals corresponding each to a transmission channel, the input of the one of the at least one receiving circuit being coupled to the n transmission conductors and to the return conductor, said receiving circuit combining the natural voltages referenced to the return conductor according to linear combinations, each of the receiving circuit output signals being mainly determined by one and only one of the modal electrical variables defined by the transition matrix from modal electrical variables to natural electrical variables.

5. The method of claim 1, wherein, in the part of the known frequency band, the impedance matrix with respect to the return conductor is a non-diagonal matrix substantially equal to the characteristic impedance matrix, the method being such that, at each point along the multiconductor transmission line, in the part of the known frequency band, the product of the per-unit-length impedance matrix and the per-unit-length admittance matrix is substantially equal to the product of a scalar and the identity matrix of order n.

6. The method of claim 5, further comprising:

using one of the at least one transmitting circuit receiving m transmitting circuit input signals corresponding each to a transmission channel, the output of the one of the at least one transmitting circuit being coupled to at least m of the transmission conductors, the transmitting circuit output delivering natural electrical variables, each of the natural electrical variables being mainly determined by one and only one of the transmitting circuit input signals; and using one the at least one receiving circuit to deliver m receiving circuit output signals corresponding each to a transmission channel, an input of the one of the at least one receiving circuit being coupled to at least m of the transmission conductors and to the return conductor, each of the receiving circuit output signals being mainly determined by the natural voltages referenced to the return conductor.

7. A device for transmission providing, in a known frequency band, m transmission channels each corresponding to a signal to be sent from an input of at least one transmitting circuit to an output of at least one receiving circuit, where m is an integer greater than or equal to 2, the device comprising:

an interconnection having n transmission conductors and a return conductor distinct from a reference conductor, n being an integer greater than or equal to m, the interconnection being modeled to a sufficient accuracy, in a part of the known frequency band, taking into account the lumped impedances seen by the interconnection and caused by the circuits connected to the interconnection elsewhere than at the ends of the interconnection, as a (n+1)-conductor multiconductor transmission line, the multiconductor transmission line using the natural voltages referenced to the return conductor and the natural currents as natural electrical variables, the multiconductor transmission line having a per-unit-length impedance matrix and a per-unit-length admittance matrix which are not both uniform or substantially uniform over the length of the multiconductor transmission line, the characteristic impedance matrix of the multiconductor transmission line being substantially uniform over the length of the multiconductor transmission line;

at least one termination circuit coupled to the return conductor and to each of the transmission conductors, said at least one termination circuit being, when in an activated state, approximately characterized, for the interconnection, at at least one quiescent operating point, for small signals in the part of the known frequency band, by an impedance matrix with respect to the return conductor, the impedance matrix with respect to the return conductor being a matrix of size n×n.

8. The device of claim 7, wherein, in the part of the known frequency band, the impedance matrix with respect to the return conductor is substantially equal to a diagonal matrix, the device further comprising:

at least one transmitting circuit receiving m transmitting circuit input signals corresponding each to a transmission channel, the output of the at least one transmitting circuit being coupled to at least m of the transmission conductors, an output of the at least one transmitting circuit delivering natural electrical variables when the at least one said transmitting circuit is in an activated state, each of the natural electrical variables being mainly determined by one and only one of the transmitting circuit input signals; and at least one receiving circuit delivering, when the at least one receiving circuit is in the activated state, m receiving circuit output signals corresponding each to a transmission channel, the input of the at least one receiving circuit being coupled to at least m of the transmission conductors and to the return conductor, each of the receiving circuit output signals being mainly determined by one and only one of the natural voltages referenced to the return conductor.

9. The device of claim 7, wherein, in the part of the known frequency band, the impedance matrix with respect to the return conductor is a non-diagonal matrix substantially equal to the characteristic impedance matrix, the device being such that, at each point along the multiconductor transmission line, in the part of the known frequency band, there exists an invertible matrix, denoted by S, such that the inverse of S times the per-unit-length impedance matrix times the per-unit-length admittance matrix times S is substantially a diagonal matrix, the matrix S being substantially uniform over the length of the multiconductor transmission line, the device further comprising:

at least one transmitting circuit receiving m transmitting circuit input signals corresponding each to a transmission channel, the output of the at least one transmitting circuit being coupled to the n transmission conductors, the transmitting circuit output delivering modal electrical variables when the at least one transmitting circuit is in an activated state, the modal electrical variables being defined by a transition matrix from modal electrical variables to natural electrical variables, the transition matrix from modal electrical variables to natural electrical variables being equal to the matrix S or to the inverse of the transpose of the matrix S, each of the modal electrical variables being mainly determined by one and only one of the transmitting circuit input signals; and at least one receiving circuit delivering, when the at least one receiving circuit is in the activated state, m receiving circuit output signals corresponding each to a transmission channel, the input of the at least one receiving circuit being coupled to the n transmission conductors and to the return conductor, the at least one receiving circuit combining the natural voltages referenced to the return conductor according to linear combinations, each of the receiving circuit output signals being mainly determined by one and only one of the modal electrical variables defined by the transition matrix from modal electrical variables to natural electrical variables.

10. The device of claim 7, wherein, in the part of the known frequency band, the impedance matrix with respect to the return conductor is a non-diagonal matrix substantially equal to the characteristic impedance matrix, the device being such that, at each point along the multiconductor transmission line, in the part of the known frequency band, the product of the per-unit-length impedance matrix and the per-unit-length admittance matrix is substantially equal to the product of a scalar and the identity matrix of order n, the device further comprising:

at least one transmitting circuit receiving m transmitting circuit input signals corresponding each to a transmission channel, an output of the at least one transmitting circuit being coupled to at least m of the transmission conductors, the transmitting circuit output delivering natural electrical variables when said at least one transmitting circuit is in an activated state, each of the natural electrical variables being mainly determined by one and only one of the transmitting circuit input signals; and at least one receiving circuit delivering, when the at least one receiving circuit is in the activated state, m receiving circuit output signals corresponding each to a transmission channel, an input of the at least one receiving circuit being coupled to at least m of the transmission conductors and to the return conductor, each of the receiving circuit output signals being mainly determined by the natural voltages referenced to the return conductor.

11. The device of claim 7, wherein the number m of transmission channels between one of the at least one transmitting circuit and one of the at least one receiving circuit is equal to the number n of transmission conductors.

12. The device of claim 7, wherein each of the at least one termination circuit is arranged at an end of the interconnection.

13. The device of claim 7, wherein the interconnection is subdivided into p interconnection segments, where p is an integer greater than or equal to 2, each of the interconnection segments being such that the each of the interconnection segments may be modeled, to a sufficient accuracy in a part of the frequency band used for transmission, as a (n+1)-conductor uniform multiconductor transmission line, the multiconductor transmission line using the natural voltages referenced to the return conductor and the natural currents as natural electrical variables.

* * * * *